(12) United States Patent
Bigelow, Jr. et al.

(10) Patent No.: US 8,117,461 B2
(45) Date of Patent: Feb. 14, 2012

(54) METHOD OF RANDOMLY AND DYNAMICALLY CHECKING CONFIGURATION INTEGRITY OF A GAMING SYSTEM

(75) Inventors: Robert Bigelow, Jr., Reno, NV (US); Dwayne A. Davis, Reno, NV (US); Kirk Rader, Reno, NV (US)

(73) Assignee: IGT, Reno, NV (US)

( * ) Notice: Subject to any disclaimer, the term of this patent is extended or adjusted under 35 U.S.C. 154(b) by 1284 days.

(21) Appl. No.: 11/520,963

(22) Filed: Sep. 13, 2006

(65) Prior Publication Data
US 2008/0076547 A1    Mar. 27, 2008

(51) Int. Cl.
  G06F 11/30    (2006.01)
  H04L 29/06    (2006.01)
  G06F 17/00    (2006.01)
  H04K 1/00     (2006.01)

(52) U.S. Cl. .............. 713/187; 726/2; 726/3; 726/4; 726/6; 726/27; 726/26; 726/29; 726/30; 713/1; 713/100; 713/150; 713/155; 713/161; 713/168; 713/170; 713/171; 713/182; 713/194; 380/28; 380/29; 380/44; 380/47; 380/251; 380/262; 380/277; 380/278; 380/30; 463/12; 463/13; 463/17; 463/18; 463/19; 463/20; 463/22; 463/29

(58) Field of Classification Search ............ 713/168, 713/171, 187; 726/26; 463/29; 380/28–29, 380/251
See application file for complete search history.

(56) References Cited

U.S. PATENT DOCUMENTS 5,110,041 A  * 5/1992 Keeler ............... 229/125.15
5,136,644 A    8/1992 Audebert et al.
(Continued)

FOREIGN PATENT DOCUMENTS
WO    WO 03/023620    3/2003
(Continued)

OTHER PUBLICATIONS

PCT International Search Report and Written Opinion mailed Mar. 7, 2008 in Application No. PCT/US2007/078410, 11 pages.
(Continued)

*Primary Examiner* — Edan Orgad
*Assistant Examiner* — Jenise Jackson
(74) *Attorney, Agent, or Firm* — Weaver Austin Villeneuve and Sampson LLP

(57) ABSTRACT

In a gaming environment, a method of periodically downloading dynamically generated executable modules at random intervals that perform system configuration integrity checks in a secure and verifiable manner is disclosed. The dynamically generated executable modules are created on a server machine and are themselves signed using industry standard PKI techniques, and contain randomly chosen subset from a repertoire of proven hashing and encryption algorithms that are executed on the system to be checked to create a unique signature of the state of that system. The dynamically generated executable module returns the signature to the server machine from which it was downloaded and deletes itself from the system being checked. The next time such an executable module is downloaded, it will contain a different randomly chosen subset of hashing and encryption algorithms. The server that is performing the system configuration integrity check maintains a database of expected system configurations and performs the same subset of hashing and encryption algorithms as contained in the dynamically generated executable module. The result returned by the downloaded executable module is compared to that computed locally, and an error condition is raised if they do not match.

18 Claims, 13 Drawing Sheets

U.S. PATENT DOCUMENTS

| | | | |
|---|---|---|---|
| 5,155,837 A | 10/1992 | Liu et al. | |
| 5,326,104 A * | 7/1994 | Pease et al. | 463/18 |
| 5,410,703 A | 4/1995 | Nilsson et al. | |
| 5,421,009 A | 5/1995 | Platt | |
| 5,421,017 A | 5/1995 | Scholz et al. | |
| 5,454,000 A | 9/1995 | Dorfman | |
| 5,473,772 A | 12/1995 | Halliwell et al. | |
| 5,555,418 A | 9/1996 | Nilsson et al. | |
| 5,643,086 A | 7/1997 | Alcorn et al. | |
| 5,654,746 A | 8/1997 | McMullan, Jr. et al. | |
| 5,682,533 A | 10/1997 | Siljestroemer | |
| 5,715,462 A | 2/1998 | Iwamoto et al. | |
| 5,759,102 A | 6/1998 | Pease et al. | |
| 5,845,077 A | 12/1998 | Fawcett | |
| 5,845,090 A | 12/1998 | Collins et al. | |
| 5,848,064 A | 12/1998 | Cowan | |
| 5,870,723 A | 2/1999 | Pare, Jr. et al. | |
| 5,885,158 A | 3/1999 | Torango et al. | |
| 5,896,566 A | 4/1999 | Averbuch et al. | |
| 5,905,523 A | 5/1999 | Woodfield et al. | |
| 5,970,143 A | 10/1999 | Schneier | |
| 6,006,034 A | 12/1999 | Heath et al. | |
| 6,029,046 A | 2/2000 | Khan et al. | |
| 6,047,128 A | 4/2000 | Zander | |
| 6,104,815 A | 8/2000 | Alcorn et al. | |
| 6,154,878 A | 11/2000 | Saboff | |
| 6,317,827 B1 | 11/2001 | Cooper | |
| 6,508,709 B1 * | 1/2003 | Karmarkar | 463/42 |
| 2002/0090986 A1 * | 7/2002 | Cote et al. | 463/16 |
| 2002/0137217 A1 | 9/2002 | Rowe | |
| 2002/0142825 A1 * | 10/2002 | Lark et al. | 463/16 |
| 2003/0064771 A1 | 4/2003 | Morrow et al. | |
| 2003/0188306 A1 | 10/2003 | Harris et al. | |
| 2003/0191942 A1 | 10/2003 | Sinha et al. | |
| 2004/0083373 A1 | 4/2004 | Perkins et al. | |
| 2005/0153776 A1 * | 7/2005 | LeMay et al. | 463/30 |
| 2005/0172162 A1 * | 8/2005 | Takahashi et al. | 714/4 |
| 2006/0093142 A1 * | 5/2006 | Schneier et al. | 380/251 |
| 2006/0148568 A1 * | 7/2006 | Schultz et al. | 463/42 |
| 2007/0021195 A1 * | 1/2007 | Campbell et al. | 463/29 |
| 2007/0026935 A1 * | 2/2007 | Wolf et al. | 463/25 |
| 2008/0015023 A1 * | 1/2008 | Walker et al. | 463/42 |
| 2008/0200245 A1 * | 8/2008 | Trobia | 463/30 |
| 2008/0263437 A1 * | 10/2008 | Kammler | 715/234 |
| 2009/0031141 A1 * | 1/2009 | Pearson et al. | 713/187 |
| 2009/0062008 A1 * | 3/2009 | Karmarkar | 463/42 |
| 2009/0124359 A1 * | 5/2009 | Beavers | 463/25 |

FOREIGN PATENT DOCUMENTS

| | | |
|---|---|---|
| WO | WO 2008/034009 | 3/2008 |

OTHER PUBLICATIONS

PCT International Preliminary Report on Patentability with Written Opinion, dated Mar. 17, 2009, 7 pages.

European Examination Report mailed Jul. 7, 2009 in Application No. 07842440.5, 4 pages.

European Communication dated May 4, 2010 re intention to grant patent application issued in EP07842440.5, 6 pages.

* cited by examiner

METHOD OF RANDOMLY AND DYNAMICALLY CHECKING CONFIGURATION INTEGRITY OF A GAMING SYSTEM

BACKGROUND OF THE INVENTION

1. Field of the Invention

The present invention relates to gaming machines and more particularly to methods of verifying the integrity of remote gaming machines.

2. Description of the Related Art

A common problem for ensuring that distributed computing system continues to operate in a correct, secure and stable fashion arises due to the ease with which individual computing devices (e.g., desk top work stations, portable client devices, server platforms, etc.) can have configuration settings changed, hardware components added or removed and application software components installed or uninstalled.

The gaming industry, in particular, must conform to extensive regulation in multiple jurisdictions where ensuring that computing devices that are deployed as part of a gaming system all conform exactly to pre approved hardware and software configuration. As the industry moves from systems largely or entirely based on custom developed hardware and software components towards the inclusion of more sophisticated commercial off the shelf products, the difficulty of monitoring and controlling the configuration of those systems will greatly increase even as the need for such monitoring becomes more severe.

To satisfy security and regulatory requirements in a gaming environment, a gaming machine must demonstrate sufficient safeguards that prevent an operator or player of the gaming machine from manipulating the hardware and software in a manner that gives them an unfair and some cases an illegal advantage. The gaming machine typically includes a means to determine if the code it will execute is valid and whether the code has been tampered with. If the code is not valid or has been tampered with, the gaming machine is believed to be compromised and game play is stopped or suspended. This can also trigger additional security operations.

Gaming safeguards come in a variety of forms. Gaming machines may include security measures that detect physical intrusion. For example, gaming machines may include a security system that monitors security switches attached to access doors of the gaming machine. Gaming machines may also utilize evidence tape to physical detect tampering between visits by a gaming regulator. The evidence tape is laid across a newly installed memory device, and if broken indicates that the memory device has been tampered with.

Gaming machines may also include security measures that detect electronic intrusion. If the code is stored on a read only memory device such as an EPROM, a unique signature can be determined for the code stored on the EPROM using a method such as a CRC. Then, prior to installing the EPROM on the gaming machine, the unique signature can be compared with an approved signature.

On less secure memory subsystems, trusted memory devices may be used to ensure the authenticity of the code. Trusted memory devices and controlling circuitry are typically designed to not allow modification of the code and data stored in the memory device while the memory device is installed in the gaming machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents is a separate third party verification device. Once the trusted memory device is verified as authentic, and based on the approval algorithms contained in the trusted device, the gaming machine is allowed to verify the authenticity of additional code and data that may be located in the gaming computer assembly such as code and data stored on hard disk drives.

While these measures work well, there is desired improved systems and techniques for ensuring that a gaming device continues to operate in a correct, secure and stable fashion.

SUMMARY OF THE INVENTION

The invention relates, in one embodiment, to a method of ensuring the validity of a data set for use in a casino-type gaming system. The method includes installing a game data set at a gaming module. The method also includes providing an exact copy of at least a portion of the game data set at an oversight module. The method further includes randomly and dynamically generating an integrity executable at the oversight module. The method additionally includes sending the integrity executable to the gaming module. Moreover, the method includes using the integrity executable, computing a first outcome from the game data set at the gaming module. The method also includes sending the first outcome to the oversight module and removing the integrity executable from the gaming module after computing the first outcome. The method additionally includes using the integrity executable, computing a second outcome from the game data set at the oversight module. The method further includes comparing the first and second outcomes to determine whether the first and second outcomes match. If the first and second outcomes match, the method includes indicating that the game data set is authentic. If the first and second outcomes do not match, the method includes indicating that the game data set is not authentic.

The invention relates, in another embodiment, to a method of performing a system configuration integrity check. The method includes, in a host, maintaining a database of expected system configurations of one or more remote systems. The method also includes, in the host, randomly and dynamically generating an executable module containing an algorithm that is configured to generate a unique signature of the state of a particular remote system. The method further includes sending the executable module to the particular remote system. The method additionally includes in the particular remote system, executing the executable module so as to generate a unique signature of the state of the actual system configuration of the particular remote system. The method also includes returning the unique signature to the host and deleting the executable module from the particular remote system. The method further includes, in the host, generating a unique signature of the state of the expected system configuration associated with the particular remote system maintained on the database using the same algorithm contained in the executable module. Moreover, the method includes, in the host, comparing the unique signature returned from the particular remote system with the unique signature generated locally at the host, and generating an error condition if the unique signatures do not match.

The invention relates, in another embodiment, to a server side method of checking the integrity of a client device. The method includes randomly and dynamically generating an executable for checking the integrity of a client device. The executable contains one or more algorithms to be performed on at least a portion of a particular system configuration of a particular client device. The method also includes communicating with a client device. The method further includes sending the executable to one or more particular client devices having the particular system configuration. The method additionally includes looking for a reply from the one or more client devices in response to performing the executable. The reply includes the outcome of the executable. If a reply is received, the method includes determining whether the client device is a trusted device based on the outcome. If a reply not received within a preset amount of time, the method includes indicating that the device is no longer trusted. Moreover, the method includes sending a trust response to the client, the trust response indicating whether the client is trusted or not trusted.

The invention relates, in another embodiment, to a client side method of checking the integrity of a client. The method includes providing a system configuration. The method also includes randomly receiving a dynamic executable from a server. The method further includes verifying the authenticity of the dynamic executable. The method additionally includes temporarily storing the dynamic executable. Moreover, the method includes running the dynamic executable on at least a portion of the system configuration to obtain an outcome.

The method may also include sending the outcome to a server. The method may further include deleting the dynamic executable and the outcome. The method may additionally include receiving a trust response from a server. The trust response indicates whether the client is trusted or not trusted. If trusted, the method includes proceeding with standard client operations. If not trusted, the method includes implementing security measures.

The invention relates, in another embodiment, to a method for randomly and dynamically generating an executable associated with testing the integrity of a remote client device associated with gaming. The method includes randomly generating a request to check a particular remote client device. The method also includes consulting a system configuration database containing an expected system configuration for the particular remote client device. The method further includes randomly selecting data to be checked from the expected system configuration of the particular remote client device. The method additionally includes consulting an algorithm database containing a plurality of hashing and verification algorithms to be performed on the select data. Moreover, the method includes randomly selecting one or more algorithms to be performed on the select data, and compiling algorithms into an executable.

The invention relates in another embodiment to a gaming system. The gaming system includes an oversight module configured to randomly monitor the integrity of one or more gaming modules operatively coupled to the oversight module to ensure that the gaming modules have not been compromised. The oversight module randomly performs audits of at least the gaming code stored on the gaming modules. The audits indicate whether the gaming code has been changed or altered from a known configuration.

In some cases, the oversight module may include a gaming module configuration database having a copy of the gaming data for each gaming module. The oversight module may also include an algorithm database that includes a plurality of security algorithms. The oversight module may further include an integrity check generator configured to randomly and dynamically generate integrity executables to be run on both the oversight module and the gaming module. The integrity executable contains one or more security algorithms. The oversight module may additionally include a comparator that compares the results of the executable run on the oversight module and the gaming module. A match indicates that the gaming module is trusted. A non match indicates that the gaming module is not trusted.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

Figure 1:
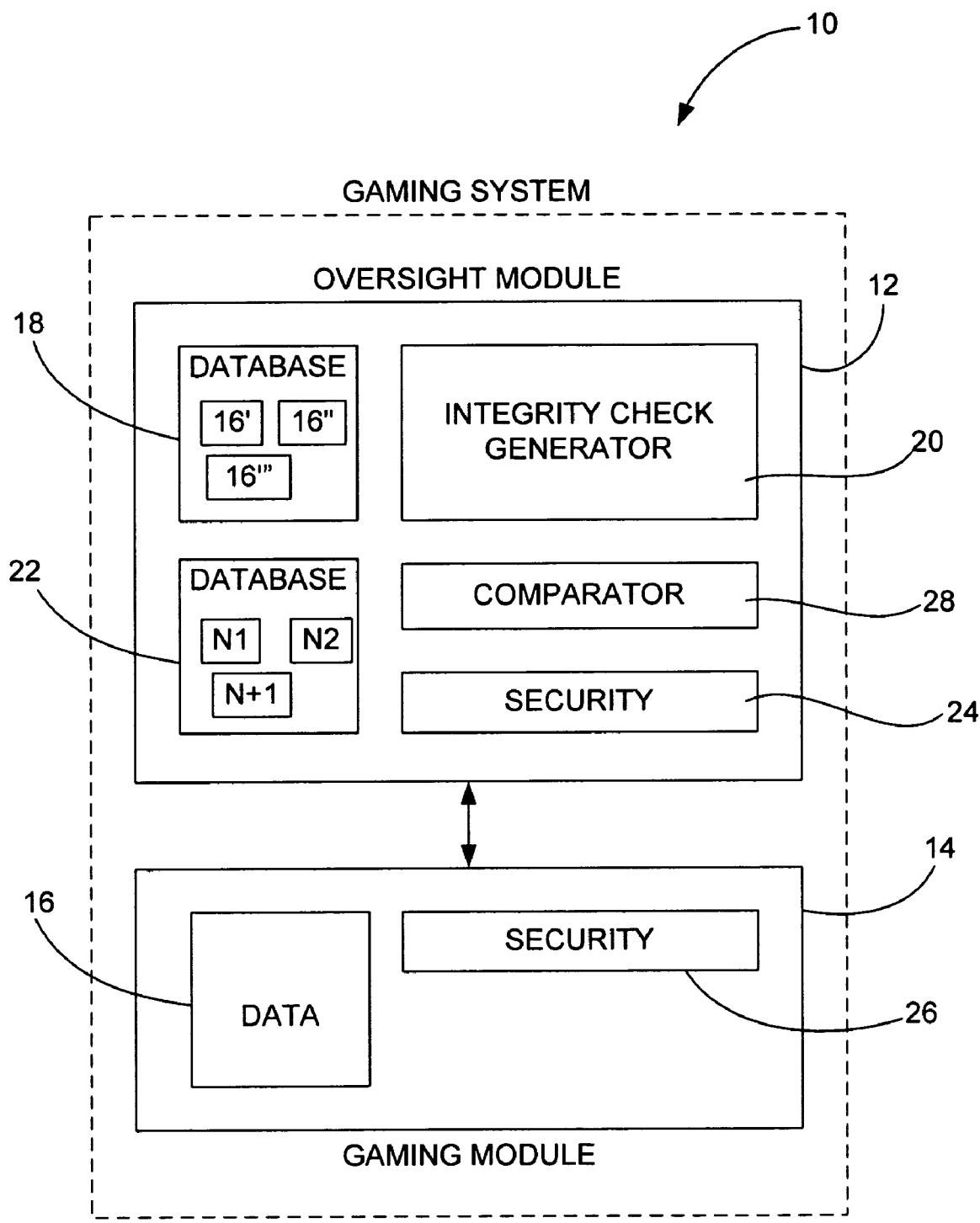
FIG. 1 is a diagram of a gaming system, in accordance with one embodiment of the present invention.

The proposed invention is a method of periodically downloading dynamically generated executable modules at random intervals that perform system configuration integrity checks in a secure and verifiable manner. The dynamically generated executable modules are created on a server machine and are themselves signed using industry standard PKI techniques, and contain randomly chosen subset from a repertoire of proven hashing and encryption algorithms that are executed on the system to be checked to create a unique signature of the state of that system.

The dynamically generated executable module then returns the signature to the server machine from which it was downloaded and deletes itself from the system being checked.

The next time such an executable module is downloaded, it will contain a different randomly chosen subset of hashing and encryption algorithms.

The server that is performing the system configuration integrity check maintains a database of expected system configurations and will perform the same subset of hashing and encryption algorithms as contained in the dynamically generated executable module. The result returned by the downloaded executable module will be compared to that computed locally, and an error condition will be raised if they do not match.

The invention relates to any computing device with a well defined hardware/software configuration that must be checked periodically for correctness and security of that configuration. This invention can be applied in any computing environment regardless of hardware platform, operating system, application software configuration, or intended purpose. The only requirements are the ability to dynamically generate and compile an executable module on a server machine, the ability to download the dynamically generated executable to a target machine whose integrity is to be verified, and the ability to communicate the result of the integrity check back to the server machine.

Generally speaking, this system is designed to check devices that have tightly constrained system configurations with limited to no ability to alter, add or delete the contents (e.g., gaming machines) although it may still be applied on devices that are loosely controlled system configurations with total control on what is created, destroyed, installed, uninstalled, etc. (e.g., personal computers).

The invention is particularly suitable in the gaming industry where ensuring that computing devices that are deployed as part of a gaming system all conform exactly to pre approved hardware and software configuration. This is especially true as the gaming industry moves from systems largely or entirely based on custom developed hardware and software components towards the inclusion of more sophisticated commercial off the shelf products, whose configuration is difficult to monitor and control.

Embodiments of the invention are discussed below with reference to FIGS. 1-13. However, those skilled in the art will readily appreciate that the detailed description given herein with respect to these figures is for explanatory purposes as the invention extends beyond these limited embodiments.

FIG. 1 is a diagram of a gaming system 10, in accordance with one embodiment of the present invention. The gaming system 10 includes an oversight module 12 that communicates with one of more gaming modules 14 associated with operating a gaming machine. The oversight module 12 is configured to randomly monitor the integrity of the gaming modules 14 to ensure that they have not been compromised. This is generally accomplished by overseeing or performing random dynamic audits of the gaming data and code 16 (e.g., software) stored at the gaming modules 14 in communication with the oversight server 12. For example, to determine if the gaming data and code 16 has been altered or changed from a known configuration.

The oversight module 12 includes a gaming module configuration database 18. The gaming module configuration database 18 includes all or a part (subsets) of the data 16 stored at the gaming modules 14. The gaming module configuration database 18 may include a copy of the data for each gaming module, or alternatively it may only include a single copy for each type of gaming module. As should be appreciated, some gaming modules are identical and therefore they contain the same set of data. For gaming modules of a different type, the gaming module configuration database 18 typically includes at least one copy of the data for each variety of gaming module. In one embodiment, in order to ensure an exact replica, the data is copied at the oversight module 12 the same time the data is installed at the gaming module 14.

The oversight module 12 also includes an integrity check generator 20. The integrity check generator 20 is configured to randomly and dynamically generate integrity executables to be run on both the oversight module 12 and the gaming module 14. By randomly, it is meant that the executable can be generated at any time. It is not generated periodically at set intervals or times, and does not follow a pattern. By dynamically, it is meant that integrity executable is not static and changes each time it is generated (e.g., uses a different set of rules each time).

In order to dynamically generate executables, the integrity check generator 20 typically consults the gaming module configuration database 18 to see what type of data to base the executable on. The executable may be based on the entire data set or it may be based on one or more subsets of the data. The integrity check generator 20 also consults an algorithm database 22 that includes a vast number of security algorithms. The algorithms may for example include a variety of encryption and hash algorithms. Any number of security algorithms may be used in the executable. For example a single algorithm may be used, or multiple algorithms may be used. The order in which the algorithms are performed in the executable may also be selected. Any configuration of algorithms applied to any portion of the data may be used.

Once the executable is generated, it is stored and a copy is made. The copy is sent to the gaming module 14 where it is stored temporarily. In order to ensure that the executable is authentic and sent from a trusted source, standard security measures including encryption and a public key infrastructure may be used. As shown, the oversight module 12 includes a security mechanism 24 and the gaming module 14 includes a security mechanism 26 that may perform encryption/decryption when the executable is sent from the oversight module 12 to the gaming module 14. In the case of PKI, the security mechanism 24 may include a public key that encrypts the message, and the security mechanism 26 may include a private key that decrypts the message.

The executable is run on both the oversight module 12 and the gaming module 14. The executable run on the oversight module 12 uses the copied data 16' stored in the gaming module configuration database 18, and the gaming module 14 uses the actual data 16 stored at the gaming module 14. The result of the executable at the gaming module 14 is sent to the oversight module 12. This may be implemented using security measures similar to those mentioned above. Thereafter, the executable is erased from the gaming module 14. This may be performed immediately after running the executable or after a predetermined amount of time (e.g., time out).

The oversight module 12 also includes a comparator 28. The comparator 28 compares the results of the executable run on the oversight module 12 with the result of the executable run at the gaming module 14. If there is a match, the integrity of the gaming module 14 has not been compromised and the gaming module 14 can be used for future gaming operations. If there is no match or if the oversight module 12 has not received the results from the gaming module within a preset amount of time, the integrity of the gaming module is believed to be compromised and one or more security measures are implemented. The security measures may for example include terminating gaming operations, performing a self destruct, initiating audio and visual alarms, erasing data, etc.

The gaming system 10 described above may be widely varied. The gaming system 10 may be embodied as a single gaming machine that includes both the oversight module 12 and the gaming module 14. The gaming system 10 may also be embodied as a gaming network with server machines and remote client machines that communicate over wired or wireless connections. In one example, a server machine includes the oversight module and a remote client machine includes the gaming module (e.g., gaming server/gaming machine). In another example, the server machine includes both the oversight module and the gaming module and the remote client machine also includes the gaming module (e.g., gaming machine/wireless handheld gaming machine). It should be appreciated that any combination may be used.

Figure 2A:
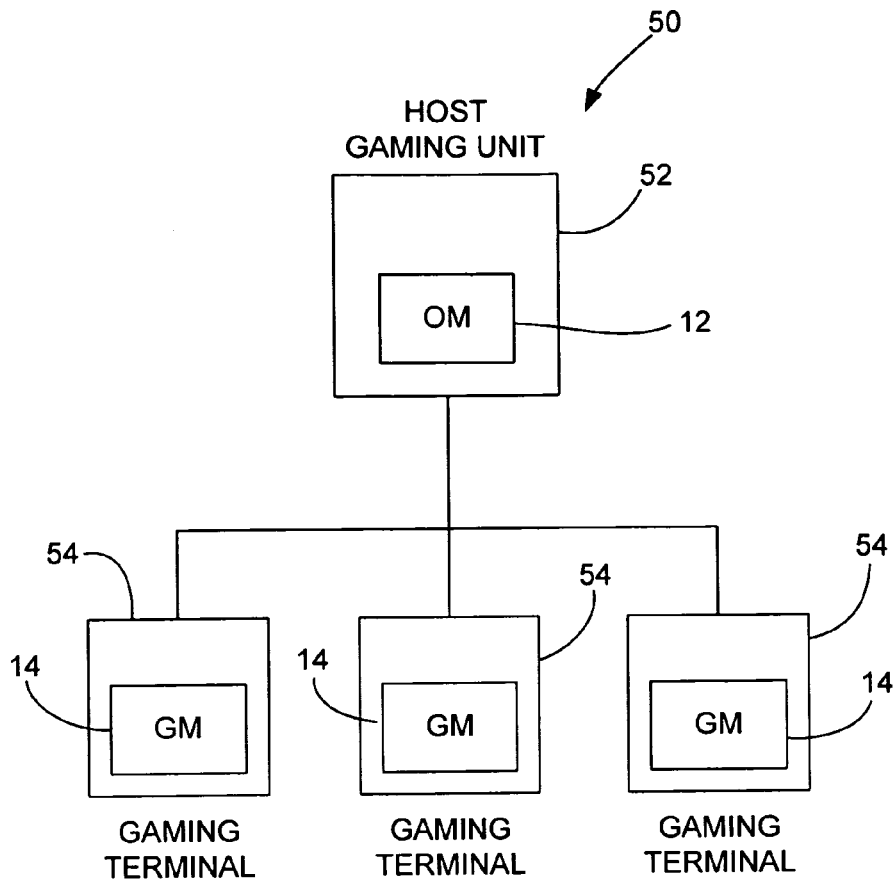
FIG. 2A is a diagram of a gaming system, in accordance with one embodiment of the present invention.
Figure 2B:
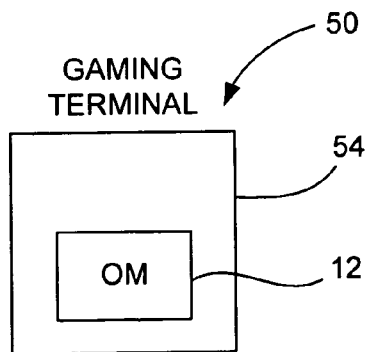
FIG. 2B is a diagram of a gaming system, in accordance with one embodiment of the present invention.
Figure 2B:
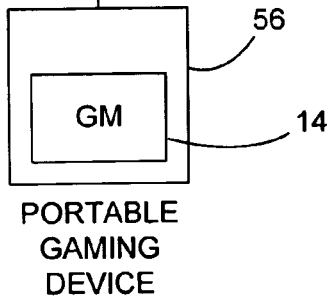

FIGS. 2A and 2B show two examples of gaming systems 50 which may incorporate the present invention. The gaming system 50 of FIG. 2A includes a host game unit 52 (e.g., server) that communicates with one or more remote gaming terminals 54 (e.g., client) The host game unit 52 includes an oversight module 12 and each of the remote gaming terminals includes a gaming module 14, which can be based on the same or different games. The remote gaming terminals 54 may be gaming machines or stations and/or portable gaming devices. For example, the gaming machines may be box variety that are situated on the casino floor, and the portable gaming devices may be handheld wireless gaming units that can be moved about the casino floor. Alternatively or additionally, the gaming machines may be general purpose computers such as towers or desktops found in homes or offices and the portable gaming devices may be laptop computers, PDAs, cell phones, media players, etc.

The gaming system 50 of FIG. 2B includes a gaming terminal 54 that communicates with a portable gaming device 56. The gaming terminal 54 includes an oversight module 12 and the portable gaming device 56 includes a gaming module 14. The gaming terminal 54 may additionally include a gaming module 14. The gaming modules may share gaming functionality or they may be distinct (when one is on the other is off). The gaming terminal 54 may be a stand alone gaming machine or a gaming machine in communication with a host game unit 52 (see FIG. 2A). In any of these examples, the host device typically acts as a server machine and the target machine acts as a client machine.

Figure 3:
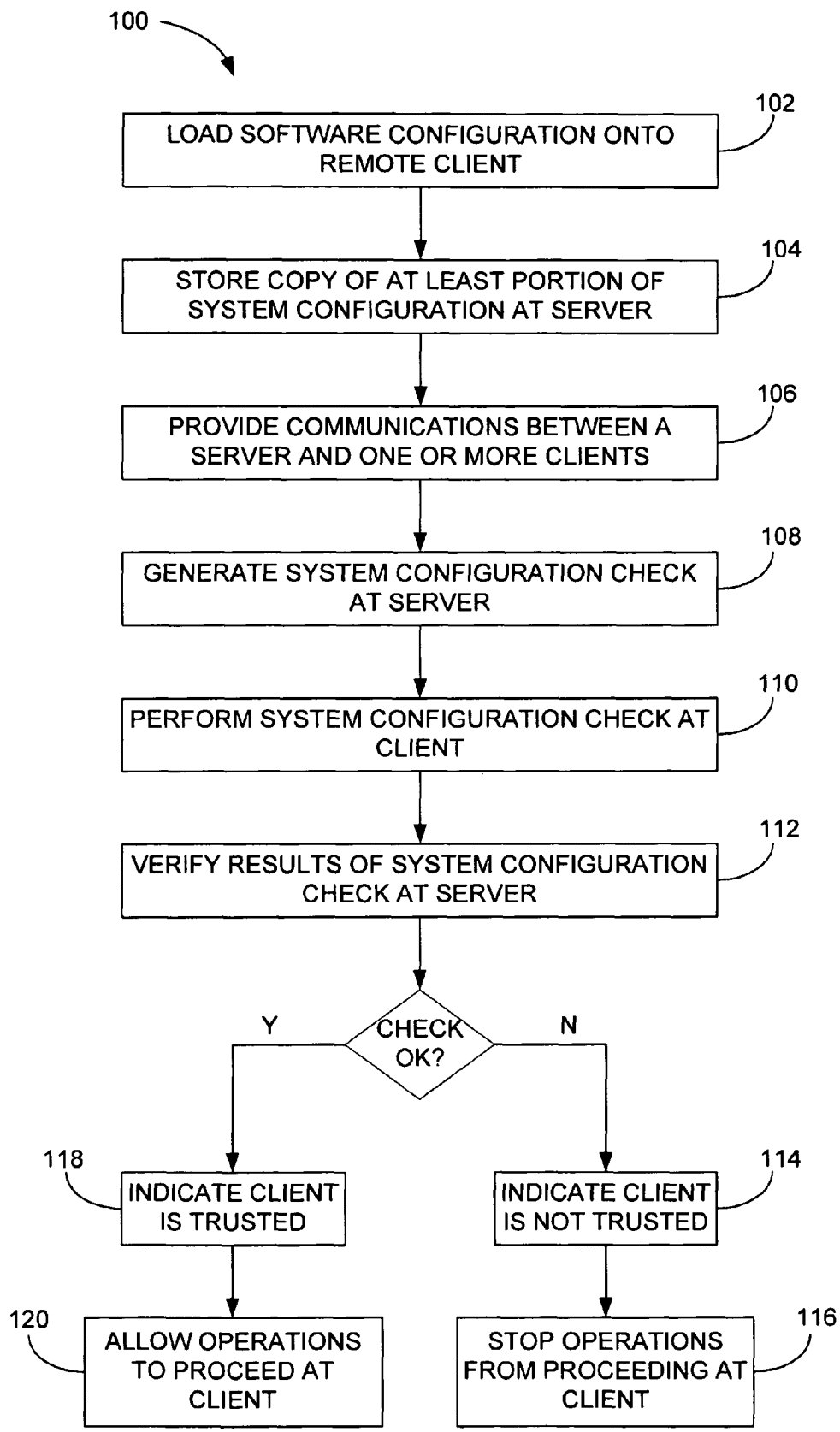
FIG. 3 is a method of checking the integrity of a computing device, in accordance with one embodiment of the present invention.

FIG. 3 is a method 100 of checking the integrity of a computing device, in accordance with one embodiment of the present invention. The method is generally discussed in context with a server/client model. The server/client model is a common form of a computer system in which software is split between server tasks and client tasks. The client typically sends requests to the server, and the server fulfills the requests. The client/server model can be used in a single computer, or across multiple computers via a network. In a network, one or more server programs provide data to client programs installed on many computers throughout the network. Any suitable network may be used.

In the context of a gaming environment, the server may be a central gaming server that communicates with a plurality of remote gaming terminals (clients). The terminal may download games from the central gaming server or may rely on the central gaming server to partially or completely run the games. In the case of completely, the gaming terminal relies completely on the server to perform all processing and outcome determinations, and typically consists solely of input, output and communication devices. Alternatively or additionally, the server may be a remote gaming terminal that communicates with a portable gaming device such as a game player (client). The portable gaming device may download games from the remote gaming terminal or may rely on the remote gaming terminal to partially or completely run the games. In the case of completely, the gaming device relies completely on the server to perform all processing and outcome determinations, and typically consists solely of input, output and communication devices. Alternatively or additionally, the server program and client program may be contained in a single gaming machine.

The method 100 begins at block 102 where a system configuration is loaded onto a remote client (e.g., remote gaming terminal). The system configuration may include all software components or particular software components such as those associated with operating a game. The method proceeds to block 104 where a copy of at least a portion of the system configuration is stored at a server (e.g., game server). If only a portion rather than the entire system configuration, the portion is typically the portion of the system configuration that cannot be compromised (e.g., gaming components).

Thereafter, in block 106, communications are provided between the server and the remote client. The communications may occur internally within a single system or externally though a network. Furthermore, the communication can occur through a wired or wireless connection.

Following block 106, the method proceeds to block 108 where a system configuration check is generated at the server. The system configuration check is configured to perform checks that the server deems appropriate. The system configuration check is based on a particular system configuration stored on the server (server needs to know just enough about the system configuration to generate the code to do the checking). The system configuration check is generally generated at randomly varying intervals. Furthermore, the check typically is dynamically generated. That is, the check is not static and changes each time the check is generated. For example, the check can be configured to run on different sets of data, using different sets of hashing and encryption algorithms.

Following block 108, the method proceeds to block 110 where the system configuration check is performed at one or more remote gaming devices, which are in communication with the hosting device and which have the particular system configuration from which the check is based. By way of example, the system configuration check is sent to the remote client, authenticated at the remote client and thereafter executed at the remote client. The system configuration check is configured to generate a distinct outcome, which can be used to verify the integrity of the remote client.

Thereafter, in block 112, the results of the system configuration checks are verified at the server. That is, the outcomes are checked to ensure that the gaming devices have not been compromised. For example, any errors in the outcome may indicate that the remote client can no longer be trusted while outcomes that do not include errors may indicate that the remote client can be trusted. The errors may for example be determined by performing the same system configuration check at the server and comparing the outcome with the outcome returned from the remote client. Because the server contains the same system configuration as the client, and uses the same check, it knows what the outcome should be for a given device. If the remote client can no longer be trusted 114, security measures 116 are typically performed on the server and/or the client. By way of example, the remote clients gaming software may be shut off, or erased, and the server may initiate an alarm to alert operators or mangers of the system. If the remote client can be trusted 118, operations are allowed to proceed at the client 120.

The method removes checking code from existing on the client and rather than running the same code each time a check is to be made, it runs a different checking code each time (e.g., the result is determined differently each time). Because different code is used for each time a check is performed, it becomes extremely difficult to guess or determine what the result will be. As such, the method is very secure (e.g., hard to tamper with, reverse engineer or hack).

Figure 4:
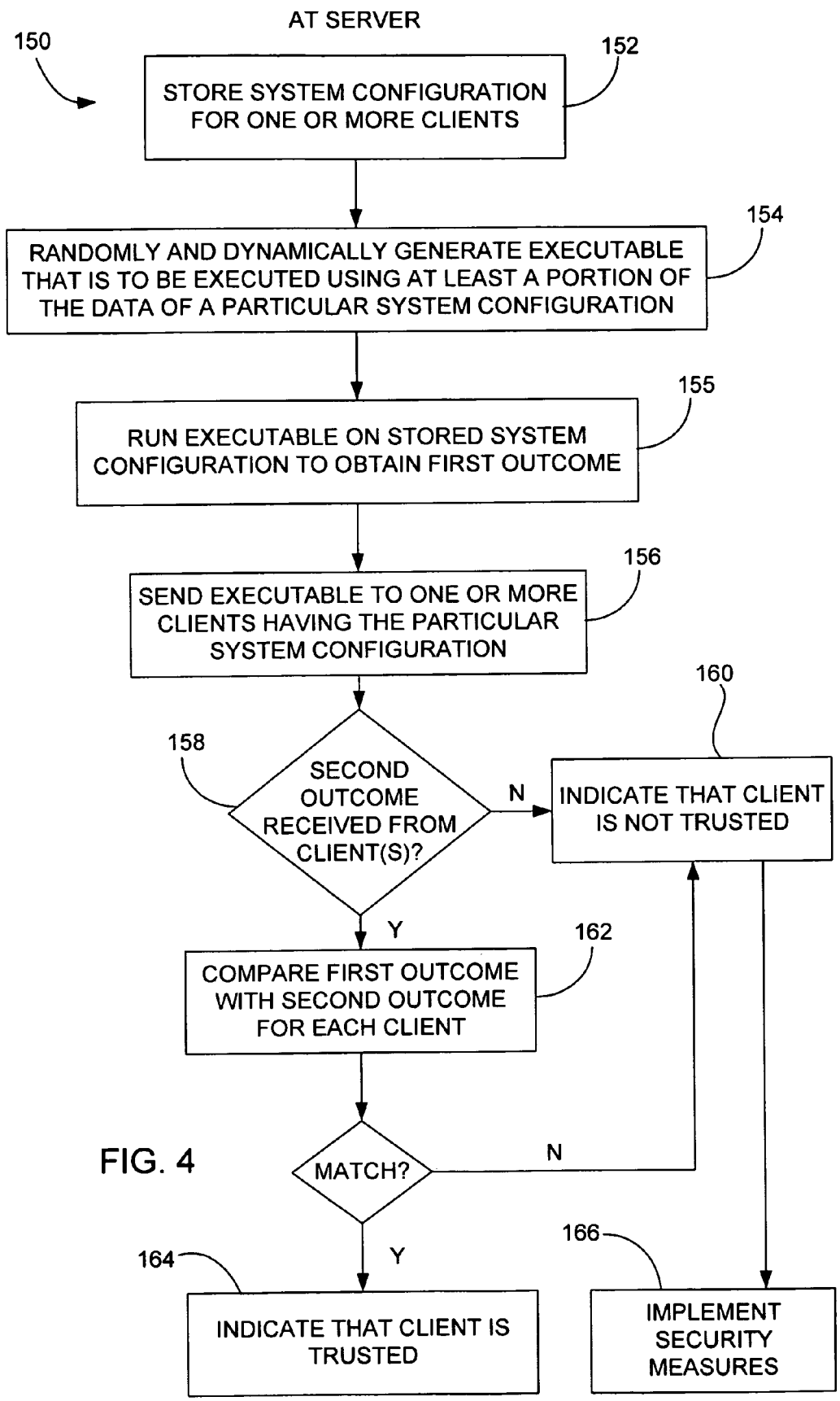
FIG. 4 is a server side method of checking the integrity of a client device, in accordance with one embodiment of the present invention.

FIG. 4 is a server side method 150 of checking the integrity of a client device, in accordance with one embodiment of the present invention. The method generally begins at block 152 where at least a portion of expected system configurations for one or more clients are stored at the server. The expected system configurations may be stored partially or in their entirety. By way of example, they may be stored in a system configuration database. The expected system configurations may be copied to the server the same time they are written to the client.

At the bare minimum, the data that is stored is typically the data or code that needs to be protected and more importantly data that should not be compromised (e.g., gaming data). In the gaming industry, the system configuration is what got approved and deployed as a gaming system. Any changes to the system make it non compliant.

Essentially, the server has a snap shot or image of all or a part of the data contained on the client. The data may be data stored entirely or partially on any type of client memory device including hard drive, RAM, ROM, etc. The term image as used herein is defined as a bit for bit duplicate of the same data even if the bits are not stored the same way (e.g., not order dependent). Typically every program or code gives a different view of the same bits and a different way of accessing and storing the same bits. This is irrelevant as the executable is going to refer to the same bits no matter how they are stored or accessed (e.g., looks at raw bits rather than a logical file system). Generally speaking, the server includes a database of all the images for the different types of clients it manages.

Following block 152, the method proceeds to block 154 where an executable module is randomly and dynamically generated. The server randomly puts together and assembles a dynamic executable. The dynamic executable specifies the data to be checked as well as the algorithms to use when checking the data, and what order to process the data or algorithms. The executable module is configured to be run using at least a portion of the data of a particular system configuration. That is, one or more subsets of the expected system configuration or the entire expected system configuration may be used.

The executable is configured with one or more algorithms including hash functions and/or encryption algorithms. A hash function is configured to generate a hash value or message digest from a string of text or code. The hash value is substantially smaller than the text itself and is generated by a formula in such a way that it is extremely unlikely that some other text will produce the same hash value. Any suitable hash function may be used in any suitable combination. In one embodiment, a single algorithm (hash function) is applied to the entire data set of the expected system configuration. In another embodiment, multiple algorithms (multiple hash functions) are applied to the entire data set of the expected system configuration. In another embodiment, the same algorithm (same hash function) is applied to different data subsets of the expected system configuration. In another embodiment, different algorithms (different hash functions) are applied to different data subsets of the expected system configuration. In yet another embodiment, algorithms (hash functions) may also be applied to the results of various algorithms (hash functions) and so on.

Following block 154, the method proceeds to block 155 where the executable is run at the server using the stored system configuration to obtain a first outcome. Although shown occurring after block 154 and before block 156, it should be noted that this is not a limitation and that block 155 may occur at other times including after receiving the outcome from the client block 158.

Following block 155, the method proceeds to block 156 where the executable is sent to one or more clients having the particular system configuration. In one embodiment, the executable is sent to all the clients having the particular system configuration. In another embodiment, the executable is only sent to a portion of the clients having the particular system configuration.

The executable is also encrypted to prevent anyone but the intended recipient from reading the executable. As is generally well known, encryption is the process of scrambling a message to ensure secrecy of that message. The message is encoded with an electronic key, which makes it undecipherable to anyone except the holder of the other half of the electronic key (e.g., public key/private key). By way of example, the client may contain the private key, which opens the executable encrypted with the public key. Any suitable encryption technique may be used. In one embodiment, Public key infrastructure (PKI) is used. PKI is a security management system including software, hardware, processes, policies, dedicated to the management of digital certificates for the purposes of secure exchanges of electronic messages. PKI enables users of basically unsecure public network to securely and privately exchange data and money through the use of a public and private cryptographic key pair that is obtained and shared through a trusted authority.

Thereafter, in block 158, a determination is made as to whether a second outcome has been returned from the client(s). This determination is typically conducted within a preset amount of time in order to ensure security. If the second outcome is not received within the preset amount of time, the method proceeds to block 160 where the client is considered compromised. If the outcome is received within the time limit, the method proceeds to block 162 where the first outcome executed at the server is compared with the second outcome executed at the client. This operation is conducted for each client that was sent the executable. If there is no match, the method proceeds to block 160. If there is a match, the method proceeds to block 164 where the client is deemed trustworthy (e.g., not compromised). In some cases, a response may be sent to the client indicating that it is trustworthy and may proceed with its operations.

Following block 160 where the client is considered compromised, the method proceeds to block 166 where security measures are implemented. For example, a command may be sent to the client instructing the client to stop operations, erase data, and the server may initiate an alarm.

Figure 5:
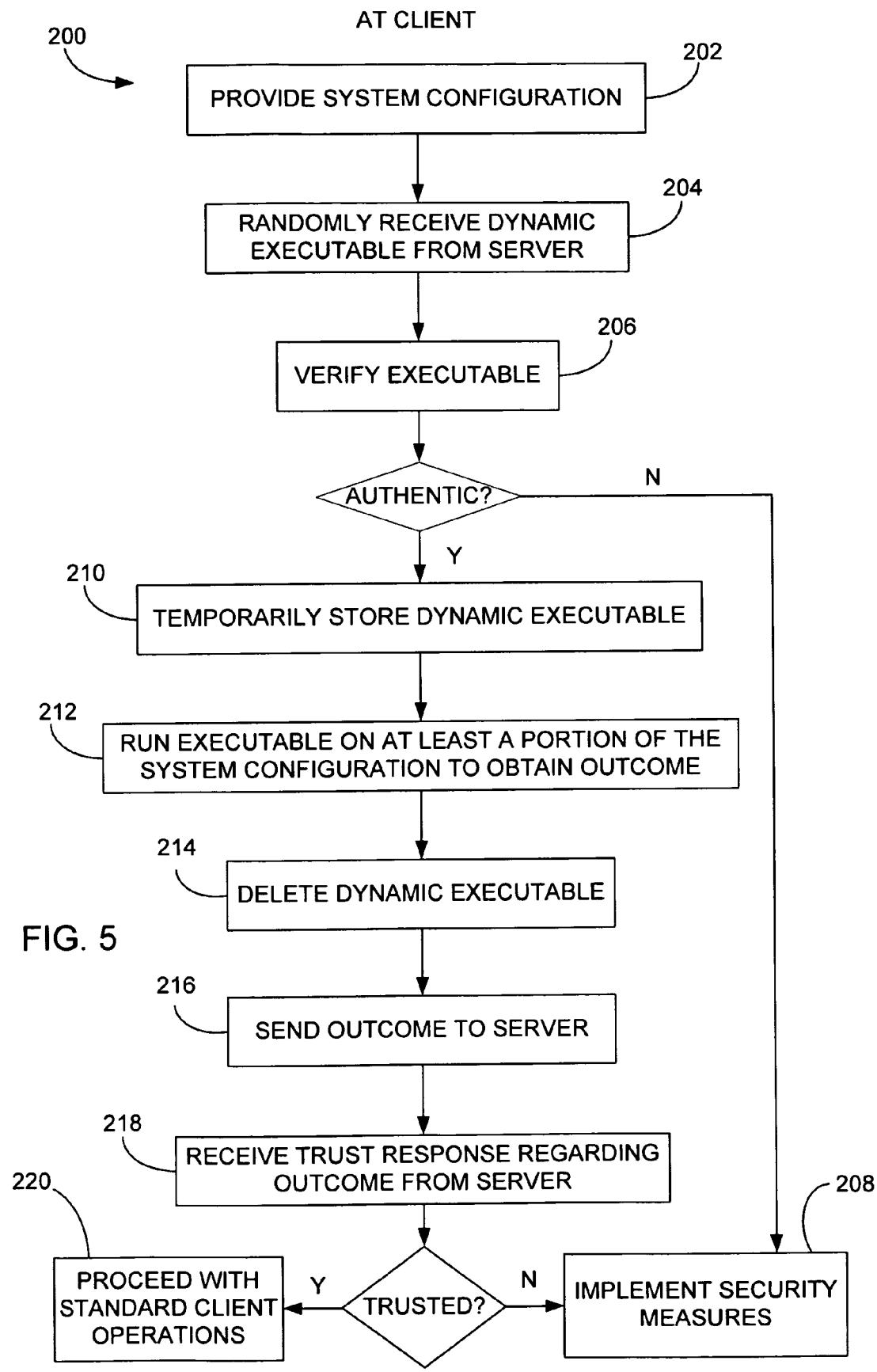
FIG. 5 is a client side method of checking the integrity of a client, in accordance with one embodiment of the present invention.

FIG. 5 is a client side method 200 of checking the integrity of a client, in accordance with one embodiment of the present invention. The method 200 generally begins at block 202 where the system configuration is provided at the client. This may for example be accomplished by installing and thereafter storing the configuration using standard gaming protocols. The system configuration typically includes running processes, executables stored on persistent memory devices on or in the machine, etc.

Thereafter, in block 204, a dynamic executable is received at random intervals from a hosting server. The executable is generated at the server and is sent at randomly varying times. Furthermore, the executable is different each time it is received (e.g., dynamic). The executable typically contains a plurality of different hashing and encryption algorithms, which are run on select parts or the entire system configuration.

Following block 204, the method proceeds to block 206 where the executable module is verified before execution. For example, when the server generates the security code, it signs it with its private key. The client verifies the signature, thereby validating that code that was in fact created by the server and that code has not been altered in transit. By way of example, standard encryption/decryption processes such as PKI may be used.

The manner in which the code interacts with the client may be widely varied. IN one implementation, the code asks the operating system of the client to load it. In this instance, the code has some knowledge of how the operating system works on the client. Further this could vary between clients, i.e., between a handheld and a gaming machine or different manufacturers of gaming machines. Thus, when the code is assembled on the host/server side, the server needs to take into account the type of operating system on the client. In another implementation, the client may know to automatically load and execute the code. Once loaded, the security code has some knowledge of how to navigate its way around the client. It may be looking for particular information (files, data, etc.) in particular memories at particular locations (RAM, NV-RAM, EPROMS, hard rives, CD-ROMS, or other trusted memory sources). In either of these cases, some code resides on the client that verifies the code prior to execution.

If the executable is not authentic, the client is deemed untrustworthy (e.g., someone may be trying to hack the system) and the method proceeds to block 208 where security measures are implemented. If the executable is authentic, the method proceeds to block 210 where the dynamic executable is temporarily stored at the client.

Following block 210, the method proceeds to block 212 where the executable module is run on the select portion of the system configuration to obtain an outcome. In one embodiment, the security code or dynamic executable is different from the gaming code, and s run with elevated privileges that provide red only access to system resources necessary for performing the security checks.

The manner in which the code finds its way around the client may be widely varied. In one implementation, the code negotiates with the OS of the client. In some cases, it uses system resources while in other cases it is autonomous with enough resources built in to do its job. In another implementation, the code accesses drivers directly. In such a cases, it may be necessary (depending on the OS) to write custom drivers that allow the code to negotiate with associated drivers without corrupting the internal state of the current OS. Generally speaking, the method of doing its job typically varies from device to device.

The access given to the code may also be widely varied. Although the client may provide unfettered access to the code, in most cases, the client provides limited access to the code. For instance, the code may be prevented from writing to certain memory or denied access to particular memory such as NV-RAM that stores the amount of credits on the gaming machine. It could also be prevented form writing to this memory or other memories such as hard drive thus denying it the ability to alter credit amounts on the gaming machine. It could also be allowed to execute only in special secure memory on the client that is isolated from other memory in the client. In one example, only read only access may be provided unless the security code accessed the hardware directly.

Following block 212, the method proceeds to block 214 where the dynamic executable is deleted from the client. This typically occurs immediately after the outcome is obtained. The executable may include instructions for deleting itself once the outcome is calculated.

Thereafter (or at the same time), in block 216 the outcome is sent to the hosting server. In most cases, a response is received 218 from the hosting server regarding the outcome, which was returned to the hosting server. The response generally indicates whether or not the client is trusted. If trusted, the method 200 proceeds to block 220 where standard client operations are allowed to proceed. For example, gaming operations may be performed. If the client is not trusted, the method proceeds to block 208 where security measures are implemented. For example, the gaming operations may be stopped, an alarm may be initiated and a message may be displayed (e.g., please see attendant).

It should be noted that the order of blocks 214 and 216 is not a limitation and that the order may be switched depending on the needs of the system.

Figure 6:
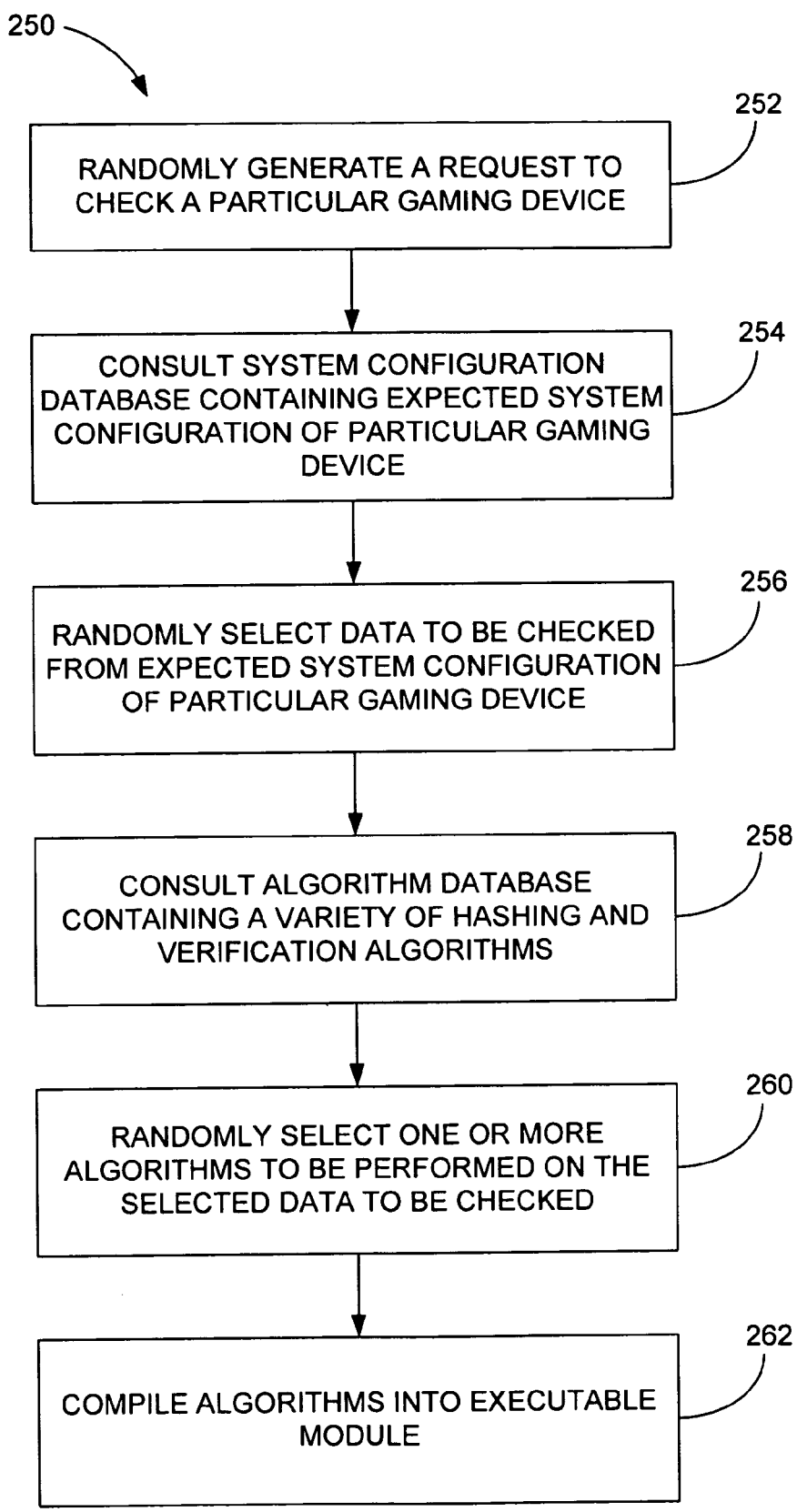
FIG. 6 is a method of randomly and dynamically generating an executable module associated with testing the integrity of a remote client device, in accordance with one embodiment of the present invention.

FIG. 6 is a method 250 of randomly and dynamically generating an executable module associated with testing the integrity of a remote client device, in accordance with one embodiment of the present invention. The method 250 may for example generally correspond to block 154 described in FIG. 4. The method generally begins at block 252 where a request to check a particular client (gaming device) is randomly generated. Although random, the request may be initiated between a minimum and maximum time limits.

Following block 252, the method 250 proceeds to block 254 where a system configuration database is consulted. The system configuration database contains expected system configurations for one or more particular clients. As mentioned above, the expected system configuration may be a copy of the entire actual system configuration or some subset of the actual system configuration.

Following block 254, the method 250 proceeds to block 256 where data to be checked is randomly selected from the expected system configuration of the particular client. The data may be all the data associated with the expected system configuration or various subsets of the expected system configuration.

Following block 256, the method proceeds to block 258 where an algorithm database is consulted. The algorithm database contains a plurality of hashing and verification algorithms that may be performed using the selected data.

Following block 258, the method proceeds to block 260 where one or more algorithms to be performed on the select data to be checked are randomly selected. In some cases, the selection may be independent of the data to be checked. In other cases, the selection may be based entirely or in part on the data to be checked. The selection may include encryption or PKI techniques for authenticating the executable module when received at the client. The selection may also include selecting algorithms to run on the results of algorithms.

Following block 260, the method proceeds to block 262 where the algorithms are compiled into an executable module. This may include determining the order and configuration in which the algorithms are run as well as which algorithms are run on which data subsets. The executable module may also be compiled with other features including for example instructions to delete itself after the outcome has been determined.

With regards to the Figures described above, the code that performs the checks can be either an executable program or a section of code designed to be run by a security program residing on the client device to be checked. In the case of an executable, the code would be a fully functioning program in its own right that is designed to run with the appropriate privileges on the client target. In the case of a section of code to be run by a separate security program, the client would have a preinstalled security application that provides low level access to system resources (Disk, RAM, Registry entries, etc). This security application would provide read-only access to said resources and would run with elevated privileges.

The dynamically generated security checking code is composed of algorithms that select which parts of the client system are to be verified and algorithms that perform some sort of operation or action on those selections. Thus a given dynamically generated security code consists of a set of one or more pairs of selectors and actions. Examples of actions include generating a hash code from a selection and forming a list from a selection. Examples of selections include looking at registry entries, file system entries, memory resident processes, etc. It should be noted that anyone skilled in the art can see that hashing and listing are only examples of actions, and that other actions are possible under this invention. The data that is returned to the requesting server will be formatted by the security code. The format includes a hash code that is generated by combining all of the requested hash codes followed by any lists that were requested in the order that they were requested. The result would be encrypted before it was transmitted back to the server.

The security checking code will make the requested selections by interacting with low-level operating system APIs. It will perform the requested actions on the selections, and finally, it will form a result and transmit the result back to the server.

Figure 7:
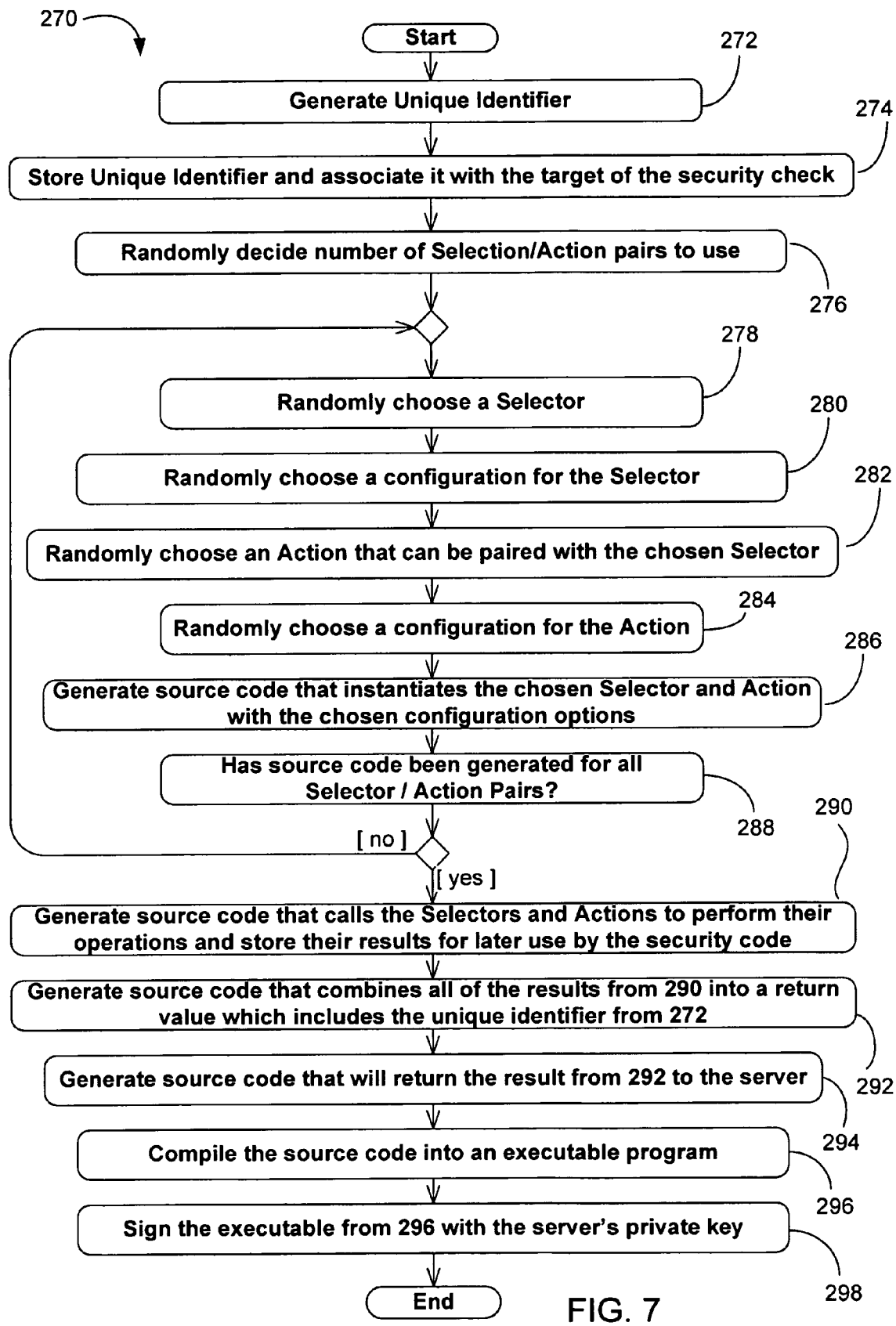
FIG. 7 is a method of generating a security code, in accordance with one embodiment of the present invention.

FIG. 7 is a method 270 of generating a security code, in accordance with one embodiment of the present invention. The method 270 begins at block 272 where a unique identifier is generated. Thereafter in block 274, the unique identifier is stored and associated with the target of the security check. Following block 274, the method proceeds to block 276 where a random decision is made as to the number of Selection/Action pairs. In block 278, a Selector is randomly chosen. In block 280, a configuration for the Selector is randomly chosen. In block 282, an Action that can be paired with the chosen Selector is randomly chosen. In block 284, a configuration for the Action is randomly chosen.

Thereafter in block 286, source code that instantiates the chosen Selector and Action with the chosen configuration options is generated. In block 288, a decision is made as to whether or not the source code has been generated for all Selector/Action pairs. If not, the method proceeds back to block 278. If so, the method proceeds to block 290 where source code that calls the Selectors and Actions to perform their operations and store their results for later use by the security code is generated.

Thereafter, in block 292, source code that combines all the results from block 290 into a return value which includes the unique identifier from block 272 is generated. In block 294, source code that will return the result from block 292 to the server is generated. In block 296, the source code is compiled into an executable program. Thereafter, in block 298, the executable is signed with the servers private key.

Figure 8:
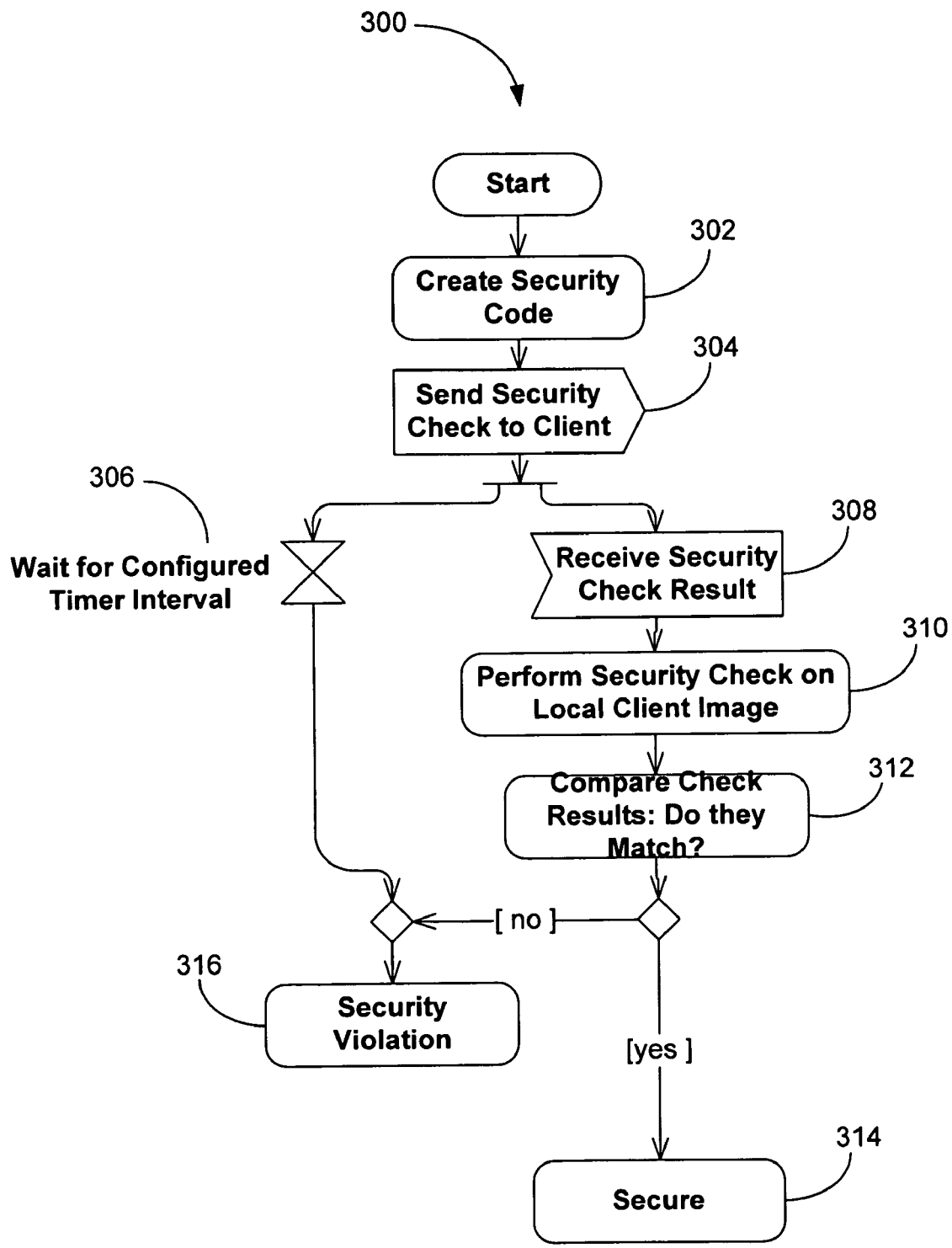
FIG. 8 is a method of initiating a check at a server, in accordance with one embodiment of the present invention.

FIG. 8 is a method 300 of initiating a check at a server, in accordance with one embodiment of the present invention. The method 300 begins at block 302 where security code is created. This block may for example correspond to the method 270 described in FIG. 7. In block 304, the security check is sent to the client. Thereafter, in block 306, a configured time interval is started. If a security check result is received during the configured time interval in block 308, the method proceeds to block 310 where the security check is performed on local client image. Thereafter, in block 312, the check results are compared. If there is a match, the system is secure as shown in block 314. If there is no match or if a security check is not received during the configured time interval, there is a security violation as shown in block 316. As should be appreciated, his diagram shows how the server initiates a check and details that there is an associated timer for the check to ensure it is completed in a timely fashion.

Figure 9:
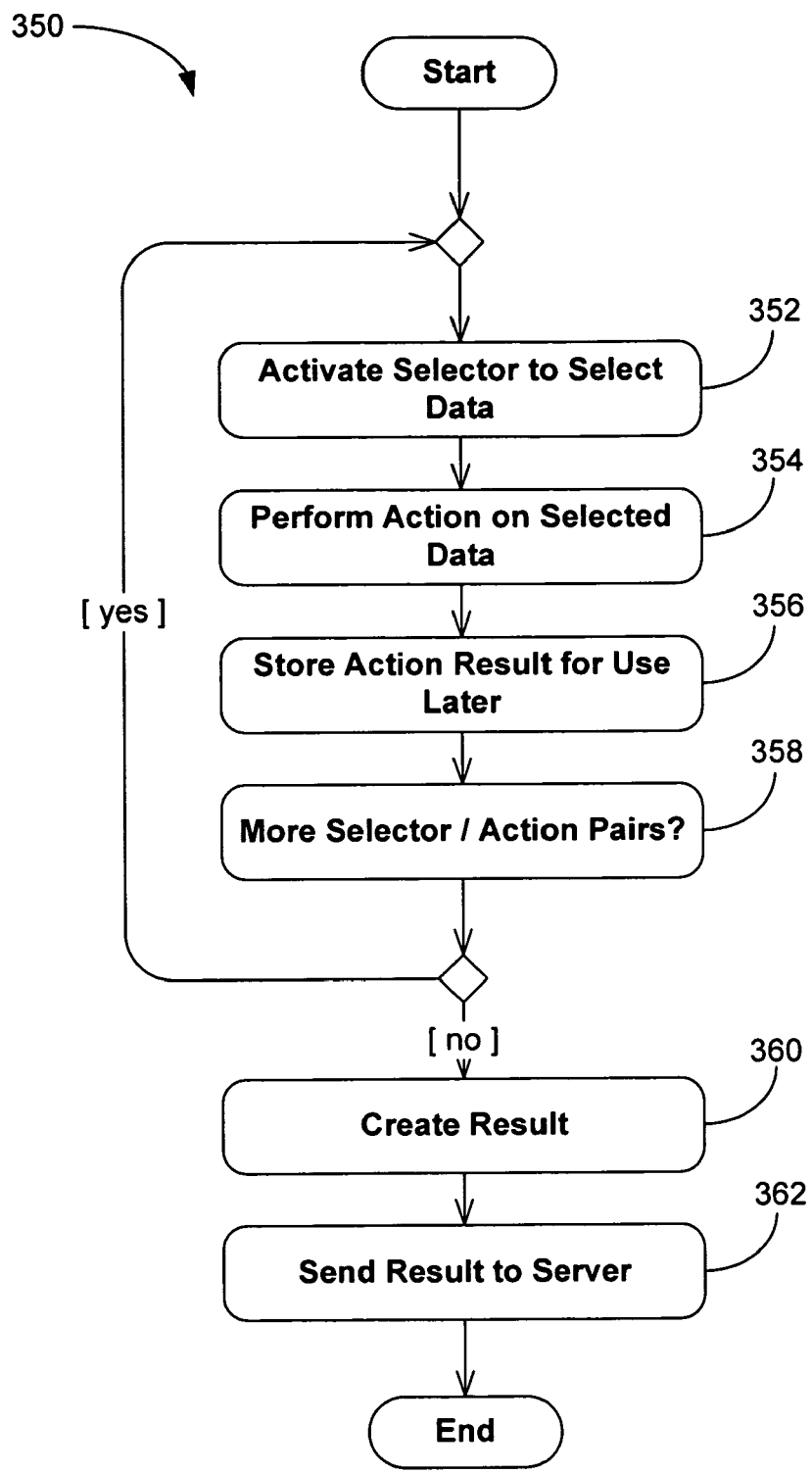
FIG. 9 is a method of performing a security check, in accordance with one embodiment of the present invention.

FIG. 9 is a method 350 of performing a security check, in accordance with one embodiment of the present invention. The method may for example be performed on the server or the client. The method begins at block 352 where a Selector is activated to Select Data. Thereafter in block 354, an Action is performed on the Selected Data. Thereafter in block 356, the Action Result is stored. Following block 356 a decision 358 is made as to whether or not more Selector/Action pairs exist. If so, the method 350 proceeds back to block 352. If not, the method 350 proceeds to block 360 where a Result is created with stored Action Results(see for example FIG. 10). Thereafter, in block 362, the Server Result is stored at the server or the Client Result is sent to the server. As should be appreciated, this diagram shows that multiple selector/action pairs may be executed to create a final Result.

Figure 10:
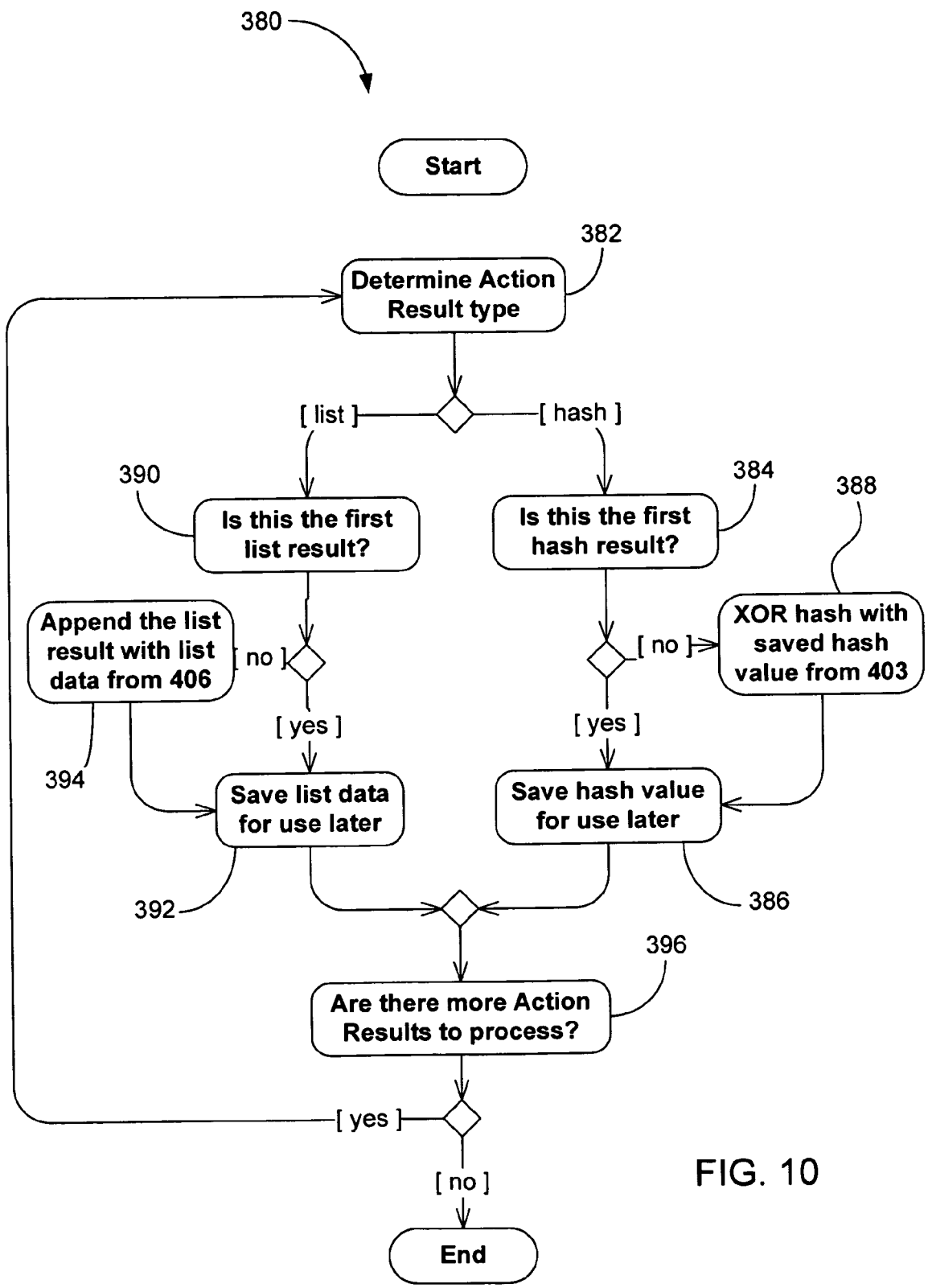
FIG. 10 is a method of combining Selector/Action pairs to create a single Result, in accordance with one embodiment of the present invention.

FIG. 10 is a method 380 of combining Selector/Action pairs to create a single Result, in accordance with one embodiment of the present invention. The method 380 may for example correspond to the block 360 in FIG. 9. The method 380 begins at block 382 where Action Result type is determined. If a hash result, the method proceeds to block 384 where a decision is made as to whether the hash result is a first hash result. If so, the method proceeds to block 386 where the hash value is saved for later. If not, the method proceeds to block 388 where hash is XOR with saved hash value from block 386. Referring back to block 382, if a list result, the method proceeds to block 390 where a decision is made as to whether the list result is a first list result. If so, the method proceeds to block 392 where the list value is saved for later. If not, the method proceeds to block 394 where the list result is appended with the list data from block 392. Following blocks 386 and 392, the method proceeds to block 396 where a determination is made as to whether there are more Action results to process. If so, the method proceeds back to block 382. If not, the method ends. As should be appreciated, this diagram shows how the results from selector action pairs are combined to create a single result. In essence, all hash values are combined, and then appended with each list value. This combined result is then stored at or sent back to the server.

Figure 11:
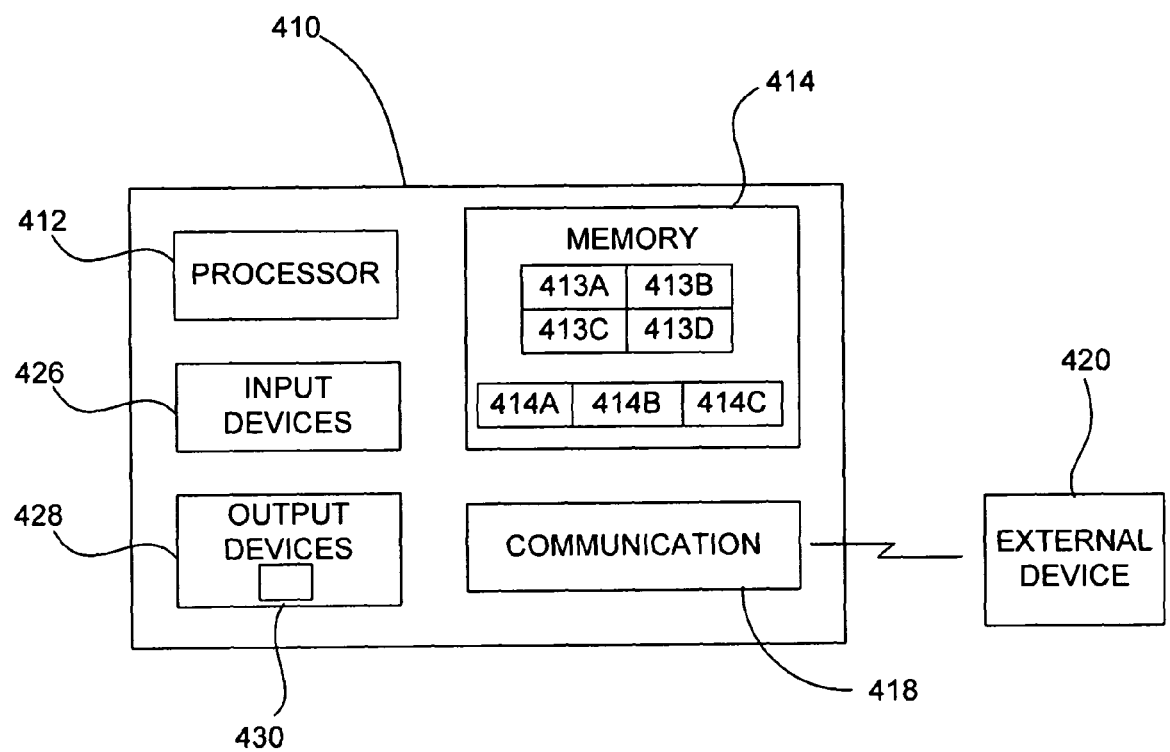
FIG. 11 is a block diagram of a gaming device, in accordance with one embodiment of the present invention.

FIG. 11 is a block diagram of a gaming device 410, in accordance with one embodiment of the present invention. As used herein, gaming device 410 refers to any device associated with game play including for example receiving credit, inputting data into a game, processing the results of the game, outputting both the game and the results of the game, recording the results of the game, monitoring the game, paying out the game, and the like. The gaming device 410 may for example be a gaming machine, a handheld portable game player, a ticket validation device, and/or the like.

The gaming device 410 typically includes a processor or controller 412 that carries out operations associated with the gaming device 410. The processor 412 operates to executes code and produce and use data. The code and data 413 may for example include log files 413A, operating systems 413B, communication code 413C, gaming code and data 413D, and the like.

The code and data 413 may reside within memory block 414 that is operatively coupled to the processor 412. The memory block 414 generally provides a place to hold data and code that is being used by the gaming device 410. The memory block 414 may include one or more memory components including non volatile memory components 414A such as ROM or flash memory, volatile memory components 414B such as RAM (in any of its various forms), and/or a hard drive 414C. The memory block 414 may also include removable media 414D such as CDs, DVDs, floppy's, magnetic tape, etc. The memory block 414 may also include memory components located over a network.

The gaming code or data 413D may include the gaming logic (all the logic for determining financials, whether a win or loss, amount of win, random numbers, etc.). The gaming data or code 413D may also include gaming state or history. The gaming data or code 413D may also include non gaming logic such as code for performing outputs and receiving inputs associated with the game being played (e.g., the code used to display the game and the results of the game).

All or a portion of the gaming code and data 413D may be stored in one or more of these memory components 414A-D. For example, the gaming code and data 413D may be stored entirely in one memory component such as hard drive 414C, RAM 414B or flash memory 414A. Alternatively, the gaming code and data 413 may be spread across multiple memory components 414. For example, a first portion may be stored in a first memory component, and a second portion may be stored in a second memory component. Additionally, a third portion may be stored in a third memory component and so on.

In one particular embodiment, the gaming code and data 413 is stored on the hard drive 414C. In fact, the hard drive 414C may be partitioned into multiple partitions where the operating system 413B resides on one partition, the gaming data and code 413D including for example executable files, binaries and resources, reside on another partition, a third partition serves as a place for writing log entries 413A, and a fourth partition contains communication code 413C designed to maintain contact with external systems such as peripherals, hosts, servers, etc.

In another particular embodiment, the gaming code and data 413 is stored in RAM 414B. For example, the hard drive 414C may contain the operating system 413B, log files 413A and communication code 413C, and the gaming data and code 413D may be downloaded from a server system at run time and stored in volatile memory.

In yet another particular embodiment, various portions of gaming code and data 413D is stored in both the hard drive 414C and RAM 414B. For example, a first portion of the gaming code and data 413D may be stored in the hard drive 414C, and a second portion of the gaming code and data 413D may be stored in RAM 414B.

The gaming device 410 also includes a communication interface 418 that is operatively coupled to the processor 412. The communication interface 418 provides a means to communicate with a external devices 420 such as server systems, peripherals, hosts, and/or the like via a data link 422 provided over a wired or wireless connection. The communication interface 418 may for example utilize the communication code 413C stored in memory 4314. In the case of a wireless connection, the communication interface 418 may include a transceiver and an antenna. Also, the communication interface 420 can use various wireless communication protocols including for example IEEE 802.11a, IEEE 802.11b, IEEE 802.11x, hyperlan/2, Bluetooth, HomeRF, etc.

The gaming device 410 also includes one or more input devices 426 that are operatively coupled to the processor 412. The input devices 426 allow a user to interact with the gaming device 410. For example, they allow a user to input data into the gaming device 410. The input devices 426 may take a variety of forms including for example buttons, switches, wheels, dials, keys, keypads, navigation pads, joysticks, levers, touch screens, touch pads, microphone, mouse, trackball, bill receptors, etc.

The gaming device 410 also includes one or more output devices 428 that are operatively coupled to the processor 412. The output devices 428 allow the gaming device 410 to interact with the user. For example, they allow the gaming device to output data associated with the game to the user. The output devices 428 may take a variety of forms including for example a display, speakers (or headset), indicator lights, display lights, printers, physical reels, etc.

In one embodiment, the gaming device 410 typically includes a display 430 such as a CRT display or LCD display for displaying a graphical user interface GUI. The GUI provides an easy to use interface between a user of the gaming device 310 and the operating system or applications (e.g., games) running thereon. Generally speaking, the GUI represents, programs, files and various selectable options with graphical images. The GUI can additionally or alternatively display information, such as non interactive text and graphics, for the user of the gaming device. In the case of a gaming machine or game player, the GUI may include the various features of the game being played thereon. Alternatively or additionally, the gaming device may include a physically reel slot.

The configuration of input and output devices 426 and 428 may vary according to the type of gaming device 410, and if a gaming machine or game player, the game or games being played thereon. Each game may have a set of dedicated inputs and outputs or multiple games may utilize the same inputs and outputs.

As mentioned above, the gaming device 410 can be widely varied. In one embodiment, the gaming device 410 is embodied as a gaming machine. In cases such as this, typically all the gaming data and code 413D is stored on memory 414 in the gaming device 410.

In another embodiment, the gaming device 410 is embodied as a handheld game player. In most cases, the handheld game player is in communication with a server system 420 such as a gaming machine or gaming server via a wireless network (such that the handheld game player is an extension of the gaming machine or gaming server). The gaming machine or gaming server 420 typically includes the gaming logic and gaming history of the gaming data or code 413D while the handheld game player includes the I/O aspects of the gaming code and data 413D. That is, the handheld game player is a remote I/O terminal that a user carries around to physically play a game remotely or away from the location where the game is actually being played electronically (server system). It should be noted however that this is not a limitation and that in some circumstances the handheld game player may include some or all aspects of the gaming logic and/or gaming history.

Alternatively, the gaming device 410 may be embodied as a peripheral gaming device such as a ticket validation device.

Examples of gaming machines and game players can be found in U.S. Pat. No. 6,846,238, which is herein incorporated by reference.

The inventions described herein have a number of advantages over the state of the art. Few deployed systems have any sort of ongoing system configuration integrity checks. Even in cases where they do, they are generally only partial checks (e.g., the networking configuration checks performed by Microsoft Windows family of operating systems that are part of its license enforcement scheme). Further, the existing checks of this sort rely on fixed code that is compiled and deployed as a permanent component of the system being checked. This makes such configuration checking code susceptible to reverse engineering, subversion through being modified or replaced in situ.

The method described herein mitigates these problems and vulnerabilities by 1) shortening the window during which the checking code can be examined and potentially subverted to that in which it is actually downloaded and executing on the target system and 2) changing the mechanism by which the check is performed each time it is downloaded and executed. The result is significant enhancement to the reliability and security of the system configuration integrity check performed using this method.

Although the methods described above are directed at server/client model, it should be noted that this is done by way of example and not by way of limitation. The methods may be applied to models other than server/client.

The invention is preferably implemented by hardware, software or a combination of hardware and software. The software can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The present invention may be practiced on a wide range of gaming machine designs. For example gaming machines with top boxes or player tracking features, gaming machines with only a single game display (mechanical, video), gaming machines designed for bar tables (face upwards).

The present invention may also be practiced in designs that include a host computer that generates a game and remote terminal or remote gaming device that displays the game and receives inputs associated with the game. The remote gaming device may for example be connected to the host computer via a network such as a local area network, a wide area network, an intranet or the internet. Furthermore, they may be connected via a wired or wireless connection. The host computer may be a game server or a gaming machine situated on a casino floor. The remote gaming device may be a gaming machine situated on the floor of a casino that communicates with a game server or alternatively a portable device such as but not limited to cell phones, PDA, Laptop, or wireless game player that communicate with a game server and/or a gaming machine.

Figure 12:
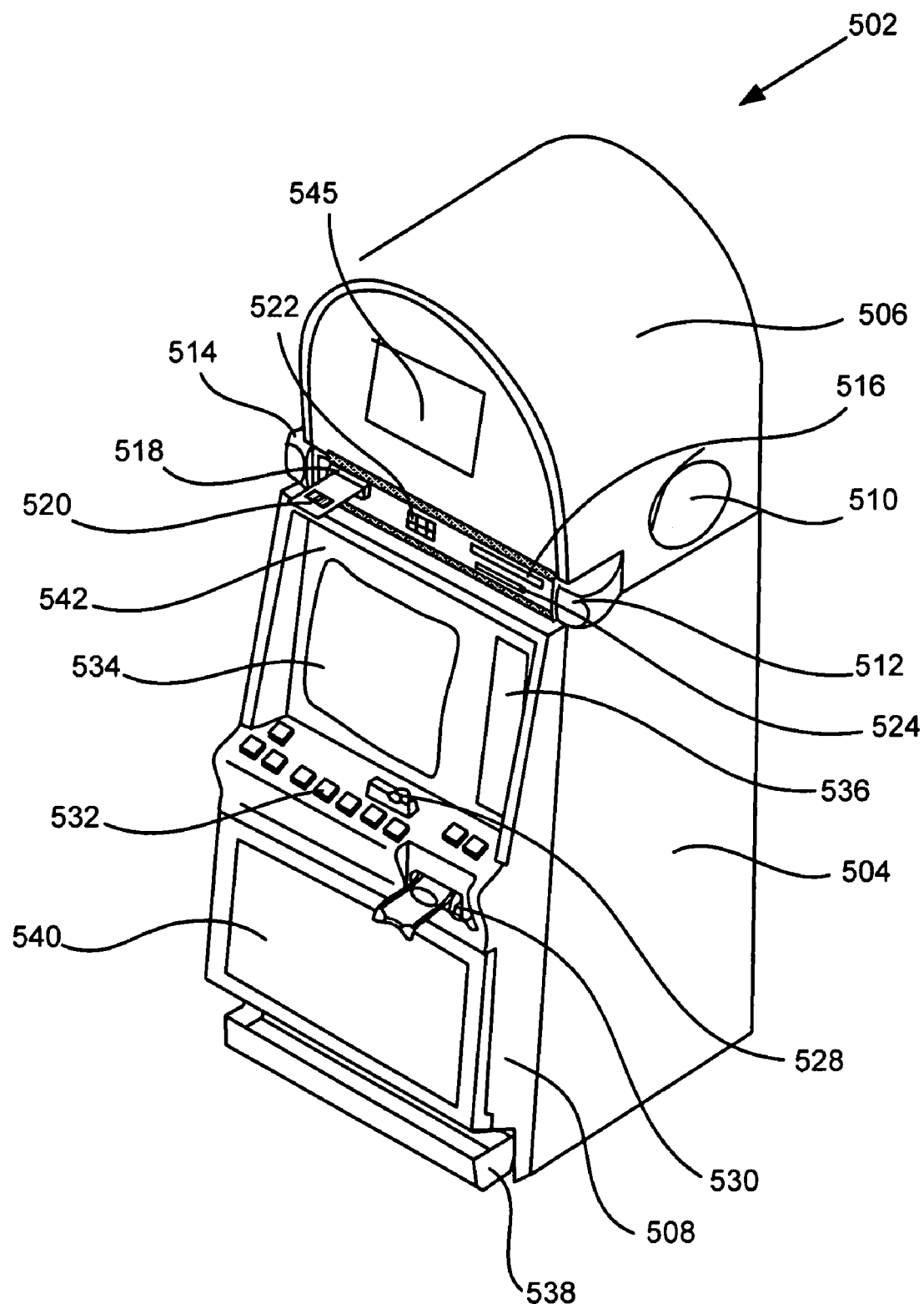
FIG. 12 is a perspective view of an exemplary gaming machine, in accordance with one embodiment of the present invention.

FIG. 12 is a perspective view of an exemplary gaming machine 502 that may be used to implement the various aspects of the present invention. As illustrated in FIG. 1, gaming machine 502 includes a main cabinet 504, which generally surrounds the machine interior and is viewable by users. The main cabinet 504 includes a main door 508 on the front of the machine 502, which opens to provide access to the interior of the machine 502. Attached to the main door 508 are player-input switches or buttons 532, a coin acceptor 528, and a bill validator 530, a coin tray 538, and a belly glass 540. Viewable through the main door 508 is a video display monitor 534 and an information panel 536. The display monitor 534 will typically be a cathode ray tube, high resolution flat-panel LCD, or other conventional electronically controlled video monitor. The information panel 536 may be a back-lit, silk screened glass panel with lettering to indicate general game information including, for example, a game denomination (e.g. $0.25 or $1). The bill validator 530, player-input switches 532, video display monitor 534, and information panel are devices used to play a game on the game machine 502. According to a specific embodiment, the devices may be controlled by code executed by a master gaming controller housed inside the main cabinet 504 of the machine 502. In specific embodiments where it may be required that the code be periodically configured and/or authenticated in a secure manner, the technique of the present invention may be used for accomplishing such tasks.

Many different types of games, including mechanical slot games, video slot games, video poker, video black jack, video pachinko and lottery, may be provided with gaming machines of this invention. In particular, the gaming machine 402 may be operable to provide a play of many different instances of games of chance. The instances may be differentiated according to themes, sounds, graphics, type of game (e.g., slot game vs. card game), denomination, number of paylines, maximum jackpot, progressive or non-progressive, bonus games, etc. The gaming machine 402 may be operable to allow a player to select a game of chance to play from a plurality of instances available on the gaming machine. For example, the gaming machine may provide a menu with a list of the instances of games that are available for play on the gaming machine and a player may be able to select from the list a first instance of a game of chance that they wish to play.

The various instances of games available for play on the gaming machine 502 may be stored as game software on a mass storage device in the gaming machine or may be generated on a remote gaming device but then displayed on the gaming machine. The gaming machine 502 may executed game software, such as but not limited to video streaming software that allows the game to be displayed on the gaming machine. When an instance is stored on the gaming machine 502, it may be loaded from the mass storage device into a RAM for execution. In some cases, after a selection of an instance, the game software that allows the selected instance to be generated may be downloaded from a remote gaming device, such as another gaming machine.

As illustrated in FIG. 12, the gaming machine 502 includes a top box 506, which sits on top of the main cabinet 504. The top box 506 houses a number of devices, which may be used to add features to a game being played on the gaming machine 502, including speakers 510, 512, 514, a ticket printer 518 which prints bar-coded tickets 520, a key pad 522 for entering player tracking information, a florescent display 516 for displaying player tracking information, a card reader 524 for entering a magnetic striped card containing player tracking information, and a video display screen 545. The ticket printer 518 may be used to print tickets for a cashless ticketing system. Further, the top box 506 may house different or additional devices not illustrated in FIG. 12. For example, the top box may include a bonus wheel or a back-lit silk screened panel which may be used to add bonus features to the game being played on the gaming machine. As another example, the top box may include a display for a progressive jackpot offered on the gaming machine. During a game, these devices are controlled and powered, in part, by circuitry (e.g. a master gaming controller) housed within the main cabinet 504 of the machine 502.

It will be appreciated that gaming machine 502 is but one example from a wide range of gaming machine designs on which the present invention may be implemented. For example, not all suitable gaming machines have top boxes or player tracking features. Further, some gaming machines have only a single game display-mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. Thus, those of skill in the art will understand that the present invention, as described below, can be deployed on most any gaming machine now available or hereafter developed.

Some preferred gaming machines of the present assignee are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures-are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

For example, a watchdog timer is normally used in International Game Technology (IGT) gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT slot machine game software is to use a state machine. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, the gaming machine does not advance from a first state to a second state until critical information that allows the first state to be reconstructed is stored. This feature allows the game to recover operation to the current state of play in the event of a malfunction, loss of power, etc that occurred just prior to the malfunction. After the state of the gaming machine is restored during the play of a game of chance, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the just prior to the malfunction including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion. Further details of a state based gaming system, recovery from malfunctions and game history are described in U.S. Pat. No. 6,804,763, titled "High Performance Battery Backed RAM Interface", U.S. Pat. No. 6,863,608, titled "Frame Capture of Actual Game Play," U.S. application Ser. No. 10/243,104, titled, "Dynamic NV-RAM," and U.S. application Ser. No. 10/758,828, titled, "Frame Capture of Actual Game Play," each of which is incorporated by reference and for all purposes.

Another feature of gaming machines, such as IGT gaming computers, is that they often include unique interfaces, including serial interfaces, to connect to specific subsystems internal and external to the slot machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the slot machine, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from a gaming machine to a remote device. Often SAS is used in conjunction with a player tracking system.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices and/or trusted memory sources are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents is a separate third party verification device. Once the trusted memory device is verified as authentic, and based on the approval of the verification algorithms included in the trusted device, the gaming machine is allowed to verify the authenticity of additional code and data that may be located in the gaming computer assembly, such as code and data stored on hard disk drives. A few details related to trusted memory devices that may be used in the present invention are described in U.S. Pat. No. 6,685,567, filed Aug. 8, 2001 and titled "Process Verification," and U.S. patent application Ser. No. 11/221,314, titled "Data Pattern Verification in a Gaming Machine Environment," filed Sep. 6, 2005, each of which is incorporated herein by reference in its entirety and for all purposes.

In at least one embodiment, at least a portion of the trusted memory devices/sources may correspond to memory which cannot easily be altered (e.g., "unalterable memory") such as, for example, EPROMS, PROMS, Bios, Extended Bios, and/or other memory sources which are able to be configured, verified, and/or authenticated (e.g., for authenticity) in a secure and controlled manner.

According to a specific implementation, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment of the present invention, the remote device and the trusted information source may engage in methods using zero knowledge proofs to authenticate each of their respective identities. Details of zero knowledge proofs that may be used with the present invention are described in US publication no. 2003/0203756, by Jackson, filed on Apr. 25, 2002 and entitled, "Authentication in a Secure Computerized Gaming System", which is incorporated herein in its entirety and for all purposes.

Gaming devices storing trusted information may utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Additional details relating to trusted memory devices/sources are described in U.S. patent application Ser. No. 11/078,966, entitled "SECURED VIRTUAL NETWORK IN A GAMING ENVIRONMENT", naming Nguyen et al. as inventors, filed on Mar. 10, 2005, herein incorporated in its entirety and for all purposes.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present. Details using a mass storage device that may be used with the present invention are described, for example, in U.S. Pat. No. 6,149, 522, herein incorporated by reference in its entirety for all purposes.

Returning to the example of FIG. 12, when a user wishes to play the gaming machine 502, he or she inserts cash through the coin acceptor 528 or bill validator 530. Additionally, the bill validator may accept a printed ticket voucher which may be accepted by the bill validator 530 as an indicia of credit when a cashless ticketing system is used. At the start of the game, the player may enter playing tracking information using the card reader 524, the keypad 522, and the florescent display 516. Further, other game preferences of the player playing the game may be read from a card inserted into the card reader. During the game, the player views game information using the video display 534. Other game and prize information may also be displayed in the video display screen 545 located in the top box.

During the course of a game, a player may be required to make a number of decisions, which affect the outcome of the game. For example, a player may vary his or her wager on a particular game, select a prize for a particular game selected from a prize server, or make game decisions which affect the outcome of a particular game. The player may make these choices using the player-input switches 532, the video display screen 534 or using some other device which enables a player to input information into the gaming machine. In some embodiments, the player may be able to access various game services such as concierge services and entertainment content services using the video display screen 534 and one more input devices.

During certain game events, the gaming machine 502 may display visual and auditory effects that can be perceived by the player. These effects add to the excitement of a game, which makes a player more likely to continue playing. Auditory effects include various sounds that are projected by the speakers 510, 512, 514. Visual effects include flashing lights, strobing lights or other patterns displayed from lights on the gaming machine 502 or from lights behind the belly glass 540. After the player has completed a game, the player may receive game tokens from the coin tray 538 or the ticket 520 from the printer 518, which may be used for further games or to redeem a prize. Further, the player may receive a ticket 520 for food, merchandise, or games from the printer 518.

Figure 13:
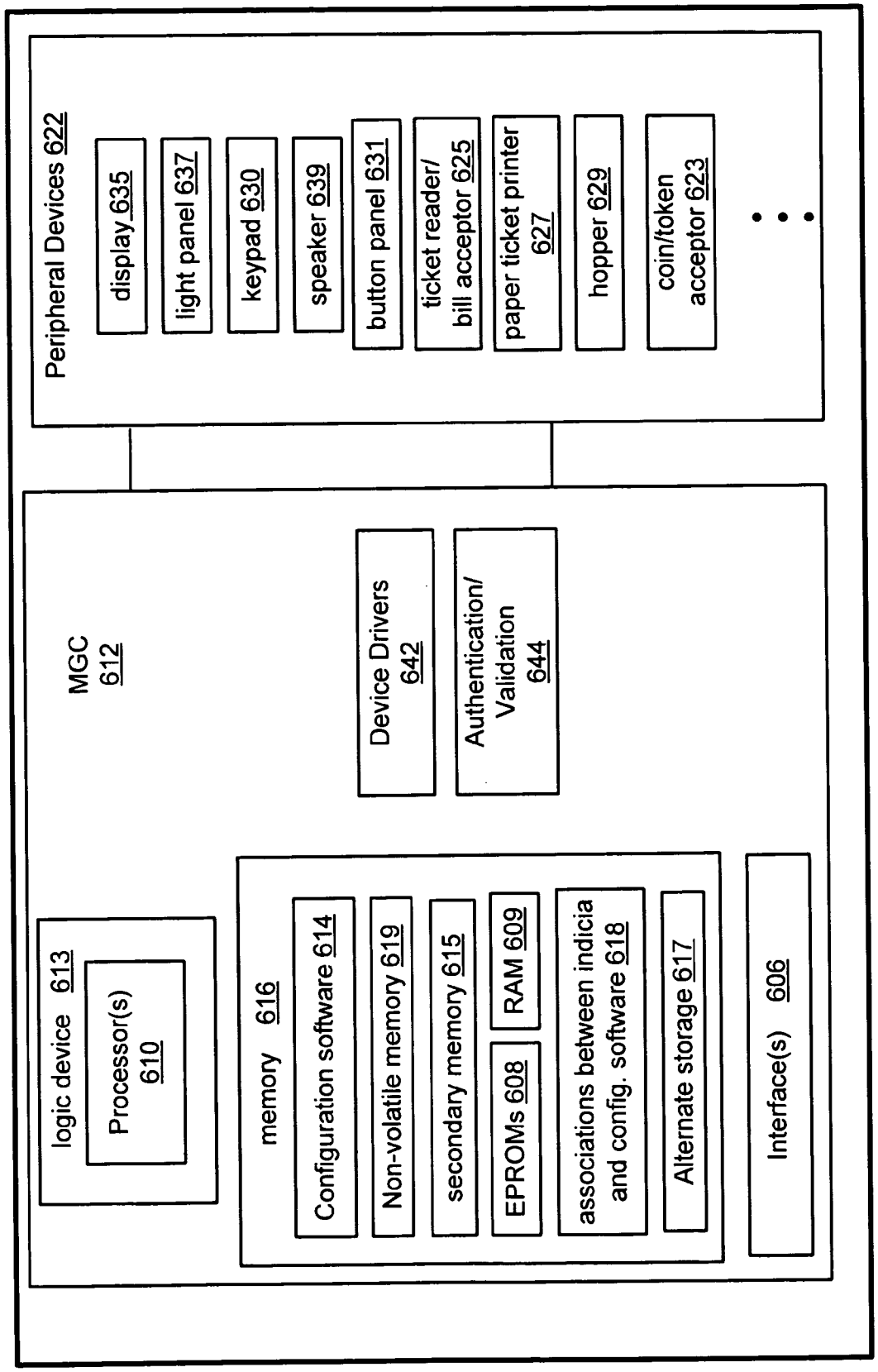
FIG. 13 is a simplified block diagram of an embodiment of a gaming machine showing processing portions of a configuration/reconfiguration system, in accordance with one embodiment of the present invention.

FIG. 13 is a simplified block diagram of an exemplary gaming machine 600 that may be used to implement the various aspects of the present invention. As illustrated in FIG. 13, gaming machine 600 includes at least one processor 610, at least one interface 606, and memory 616.

In one implementation, processor 610 and master gaming controller 612 are included in a logic device 613 enclosed in a logic device housing. The processor 610 may include any conventional processor or logic device configured to execute software allowing various configuration and reconfiguration tasks such as, for example: a) communicating with a remote source via communication interface 606, such as a server that stores authentication information or games; b) converting signals read by an interface to a format corresponding to that used by software or memory in the gaming machine; c) accessing memory to configure or reconfigure game parameters in the memory according to indicia read from the device; d) communicating with interfaces, various peripheral devices 622 and/or I/O devices 611; e) operating peripheral devices 622 such as, for example, card reader 625 and paper ticket reader 627; f) operating various I/O devices such as, for example, display 635, key pad 630 and a light panel 616; etc. For instance, the processor 610 may send messages including configuration and reconfiguration information to the display 635 to inform casino personnel of configuration progress. As another example, the logic device 613 may send commands to the light panel 637 to display a particular light pattern and to the speaker 639 to project a sound to visually and aurally convey configuration information or progress. Light panel 637 and speaker 639 may also be used to communicate with authorized personnel for authentication and security purposes.

Peripheral devices 622 may include several device interfaces such as, for example: card reader 625, bill validator/paper ticket reader 627, hopper 629, etc. Card reader 625 and bill validator/paper ticket reader 627 may each comprise resources for handling and processing configuration indicia such as a microcontroller that converts voltage levels for one or more scanning devices to signals provided to processor 610. In one embodiment, application software for interfacing with peripheral devices 622 may store instructions (such as, for example, how to read indicia from a portable device) in a memory device such as, for example, non-volatile memory, hard drive or a flash memory.

The gaming machine 600 also includes memory 616 which may include, for example, volatile memory (e.g., RAM 609), non-volatile memory 619 (e.g., FLASH memory, EPROMs, battery backed RAM, etc.), unalterable memory (e.g., EPROMs 608), alternate storage 6517 (e.g., non-volatile memory implemented using disk drive(s), flash memory, remote storage, etc.), etc. The memory may be configured or designed to store, for example: 1) configuration software 614 such as all the parameters and settings for a game playable on the gaming machine; 2) associations 618 between configuration indicia read from a device with one or more parameters and settings; 3) communication protocols allowing the processor 610 to communicate with peripheral devices 622 and I/O devices 611; 4) a secondary memory storage device 615 such as a non-volatile memory device, configured to store gaming software related information (the gaming software related information and memory may be used to store various audio files and games not currently being used and invoked in a configuration or reconfiguration); 5) communication transport protocols (such as, for example, TCP/IP, USB, Firewire, IEEE1394, Bluetooth, IEEE 802.11x (IEEE 802.11 standards), hiperlan/2, HomeRF, etc.) for allowing the gaming machine to communicate with local and non-local devices using such protocols; etc. Typically, the master gaming controller 612 communicates using a serial communication protocol. A few examples of serial communication protocols that may be used to communicate with the master gaming controller include but are not limited to USB, RS-232 and Netplex (a proprietary protocol developed by IGT, Reno, Nev.).

A plurality of device drivers 642 may be stored in memory 616. Example of different types of device drivers may include device drivers for gaming machine components, device drivers for peripheral components 622, etc. Typically, the device drivers 642 utilize a communication protocol of some type that enables communication with a particular physical device. The device driver abstracts the hardware implementation of a device. For example, a device drive may be written for each type of card reader that may be potentially connected to the gaming machine. Examples of communication protocols used to implement the device drivers 659 include Netplex 660, USB 665, Serial 670, Ethernet 675, Firewire 685, I/0 debouncer 690, direct memory map, serial, PCI 680 or parallel. Netplex is a proprietary IGT standard while the others are open standards. According to a specific embodiment, when one type of a particular device is exchanged for another type of the particular device, a new device driver may be loaded from the memory 616 by the processor 610 to allow communication with the device. For instance, one type of card reader in gaming machine 60 may be replaced with a second type of card reader where device drivers for both card readers are stored in the memory 616.

In some embodiments, the gaming machine 600 may also include various authentication and/or validation components 644 which may be used for authenticating/validating specified gaming machine components such as, for example, hardware components, software components, firmware components, information stored in the gaming machine memory 616, etc. Examples of various authentication and/or validation components are described in U.S. Pat. No. 6,620,047, entitled, "ELECTRONIC GAMING APPARATUS HAVING AUTHENTICATION DATA SETS," incorporated herein by reference in its entirety for all purposes.

In some embodiments, the software units stored in the memory 616 may be upgraded as needed. For instance, when the memory 616 is a hard drive, new games, game options, various new parameters, new settings for existing parameters, new settings for new parameters, device drivers, and new communication protocols may be uploaded to the memory from the master gaming controller 604 or from some other external device. As another example, when the memory 616 includes a CD/DVD drive including a CD/DVD designed or configured to store game options, parameters, and settings, the software stored in the memory may be upgraded by replacing a first CD/DVD with a second CD/DVD. In yet another example, when the memory 616 uses one or more flash memory 619 or EPROM 608 units designed or configured to store games, game options, parameters, settings, the software stored in the flash and/or EPROM memory units may be upgraded by replacing one or more memory units with new memory units which include the upgraded software. In another embodiment, one or more of the memory devices, such as the hard-drive, may be employed in a game software download process from a remote software server.

It will be apparent to those skilled in the art that other memory types, including various computer readable media, may be used for storing and executing program instructions pertaining to the operation of the present invention. Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files including higher level code that may be executed by the computer using an interpreter.

Additional details about other gaming machine architectures, features and/or components are described, for example, in U.S. patent application Ser. No. 10/040,239, entitled, "GAME DEVELOPMENT ARCHITECTURE THAT DECOUPLES THE GAME LOGIC FROM THE GRAPHICS LOGIC," and published on Apr. 24, 2003 as U.S. Patent Publication No. 20030078103, incorporated herein by reference in its entirety for all purposes.

As mentioned previously, there is a need to preserve certain types of game play data from gaming machines. Such data may be necessary to address disputes that players may have with a casino or other gaming establishment over whether or not a winning combination occurred, the amount of pay out due, etc. Further, casino operators sometimes need the same or related information for other reasons such as re-creating events that led to a malfunction, collecting statistical information before a power failure, logging the types of games played over the life of a particular machine, etc.

Among the types of commonly preserved data is so-called "critical data" or "critical game information," which must be maintained by casinos or other gaming machine establishments. Such data may be stored as simple text and/or graphics. In some cases, entire frames of video data may be captured for this purpose. See for example U.S. patent application Ser. No. 10/758,828 filed Jan. 15, 2004, herein incorporated by reference in its entirety for all purposes.

Typically gaming machines are provided with finite resources for storing the various types of game play data. Such resources often take the form of non-volatile RAM (NV-RAM), magnetic disk mass storage, etc.

Gaming regulators, such as the Nevada gaming commission, require that gaming machines save critical data for a certain length of time (e.g., a set number of games) before allowing older critical data to be purged from a gaming machine. To this end, gaming machine manufacturers sometimes store such data in battery-backed non-volatile RAM. This allows critical data to be stored without power for long periods of time. See the discussion in U.S. Pat. No. 6,804,763, herein incorporated by reference in its entirety for all purposes.

An ancillary issue arises with regard to preserving game data when a game is being removed from a gaming machine. Traditionally, a given gaming machine was born with and died with a single game, e.g., a video poker game. Modern technology allows games to be removed for various reasons such as because a license for the game has expired or because replacement with a different game is expected to increase revenue. A technology enabling such situations is downloadable code for individual games that can be executed on a given gaming machine or other terminal. In some terminals, only a single game is available for play at any given time. In other terminals, multiple games are available for user selection at particular instants in time.

Electronic downloading of the necessary software into the gaming machine allows a gaming machine to access scalable server farms and databases to select a set of games it needs from the game library. A desire of casino operators after games are safely downloaded is the ability to electronically move the games around on the casino floor. Casino managers routinely move slot machines (entire slot machine) around the floor in search of the optimum layout. A popular new game might be located near the door, but an older game might be better suited in the back. A Harley-Davidson™ game might be moved to the front during a Biker's convention, etc.

Currently, when a game is removed from a gaming machine, that "entire game," including the game image and all statistical, counter, and historical information is deleted together, at one time. The "game image" refers to executable code for playing a given game on a master gaming controller. There are various difficulties with this approach. First, because the history of a game must be preserved, some special effort is required to capture that history before the game is wiped clean from the terminal. In some cases, this is done manually by an attendant, who may review meters and other records as necessary at the time the game is removed. In addition or alternatively, casino personnel may instruct a server to capture recent accounting and/or game history information as necessary. Obviously, the operator intervention required for these efforts represents some burden for the casino or other gaming establishment.

On top of the efforts required to capture critical data and other relevant game play data, an operator may be required to reset all manner of ancillary conditions associated with the game before a new game can be installed on the terminal. For example, the operator may be required to re-seed a random number generator, reset various meters, set background colors associated with games, etc.

As disclosed in related U.S. patent application Ser. No. 10/243,104, a method and apparatus are taught for dynamically downloading or removing a game(s) stored on a gaming machine without altering or deleting "critical data" unrelated to the added or removed game(s). The term critical data may be defined as data that records the past and present states of a gaming machine. Examples of such states include a game's history, accounting, security information, or the like. This type of critical data may be stored in a gaming machine's non-volatile memory. In one embodiment when downloading or removing a game(s) in a gaming machine occurs, critical data is added or removed by allocating or de-allocating memory space in a non-volatile random access memory (NV-RAM) of a gaming machine.

Gaming regulators, such as the Nevada gaming commission, require that gaming machines prohibit the writing of code, data and/or other gaming information to gaming machine disk drives by sources other than trusted memory sources which have been properly verified and authenticated. Because of such regulatory constraints, it has been conventional practice in the gaming industry to design and implement mechanisms for preserving critical data in the gaming machine's non-volatile RAM without utilizing memory storage at the gaming machine's disk drive(s). Thus, for example, a number of embodiments of U.S. patent application Ser. No. 10/243,104 relate to methods to maximize the use of free memory space in an NV-RAM during the course of the gaming machine's operation and maintenance. A number of embodiments of that patent application also relate to methods to efficiently utilize the memory space in an NV-RAM when a game is downloaded or removed from a gaming machine. In one embodiment, a method is disclosed for dynamically sizing the NV-RAM memory space based on the gaming machine's operational requirements.

Contrary to conventional practice, however, various embodiments of the present invention are directed to different techniques for managing the storage of game related data and/or critical data in both non-volatile RAM and alternate storage of the gaming machine which, for example, may include one or more disk drives. For example, one implementation of the present invention is directed to a technique for automatically and dynamically swapping critical data and/or other game related information between the non-volatile RAM (NV-RAM) and the alternate storage (e.g., disk drive) of the gaming machine as new games are added and/or existing games are removed to/from the gaming machine.

In at least one embodiment, the technique of the present invention is adapted to take advantage of the fact that games may be divided into different portions having differing preservation needs. These different portions may be saved to set locations for set periods of time when a downloaded game that was once available on a given gaming terminal must be disabled, removed or otherwise made unavailable on the gaming terminal. The removal process may be automated or controlled remotely, although this is not strictly required. Further, the invention may be implemented using directories of the various game components for multiple downloaded games available to a single gaming terminal.

As suggested previously, one aspect of the present invention involves preserving a portion of a game containing specified game information, such as historical information, when a game is removed from a gaming terminal. In accordance with this invention, a game may be any game of chance such as, for example, slot games, video poker games, lottery games, and the like. A gaming terminal is generally any apparatus that supports playing a downloaded game. Examples include stand alone and networked gaming machines, personal computers, cell phones, personal digital assistants, and the like. FIG. 12 depicts a gaming machine, which represents a specific embodiment of a gaming terminal for implementing the present invention. In order support downloading, a gaming terminal may be connected via a network to a source of games for downloading. Of course, this is not strictly required because, for example, games may be downloaded from portable memory devices that are temporarily resident on the gaming terminal.

In accordance with certain embodiments of the invention, a downloaded game has multiple portions or components, which have differing preservation requirements. When a downloaded game is to be removed from a gaming terminal, the various components are treated differently in terms of (1) whether or not they are preserved, (2) where they are stored, and (3) for how long they are stored. Thus, embodiments of the invention pertain to partial or staged removal of a downloaded game from a gaming terminal.

A typical game of chance contains logic and data for, among other things, processing player inputs, determining a game outcome, presenting a game display to the player (via typically video and audio output), and storing various pieces of information about the game. One way to visualize a game is as combination of non-modifiable portions and accumulative portions. The non-modifiable portions generally include, at least, executable code for implementing the game, which code processes user inputs, calculates game outcomes (using typically a random number generator), and presents the game to the user on the gaming terminal. The accumulative portions of a game are typically data and associated contextual information specifying such things as game history, game meter values, various types of accounting information, specific frames from the game play, game outcomes, numbers of games played, denominations played, and the like. In some cases, the accumulative portion comprises minimal state information required to re-create a game play using executing game code. In general, accumulative components are, as their name suggests, portions of the game that are accumulated and therefore saved at least temporarily.

In certain embodiments, the accumulative portions of the game may be divided into various subsets of data or derived components distinguished based on content. For example, one subset or derived component may be deemed particularly important for long-term storage and referred to as "permanent" data. Examples of permanent data include number of games played and the mere fact that a particular game was resident and/or played on a particular terminal at one time in the past, and the like. Examples of derived permanent data include, for example, win/loss ratios, average payback, and the like. Obviously, designating particular accumulative data as "permanent" is a choice made based upon the importance attached to that data by the particular gaming establishment or regulatory body having control or jurisdiction.

Some accumulative data may be designated as critical data or critical game information. The designation of some accumulative data as "critical" is dependent upon the requirements of controlling entities such as casinos and goveruental bodies. In typical cases, critical data may comprise one or more of game history information, security information, accounting information, player tracking information, wide area progressive information and game state information. A few specific examples of critical data may include, for example, one or more of the following: (1) Main door/Drop door/Cash door openings and closings, (2) Bill insert message with the denomination of the bill, (3) Hopper tilt, (4) Bill jam, (5) Reel tilt, (6) Coin in and Coin out tilts, (7) Power loss, (8) Card insert, (9) Card removal, (10) Jackpot, (11) Abandoned card (12) querying the non-volatile memory for the current credit available on the gaming machine, (13) reading the credit information from a player's card, (14) adding an amount of credits to the gaming machine, (15) writing to a player's card via the card reader and the device drivers to deduct the amount added to gaming machine from the card and (16) copying the new credit information to the non-volatile memory. Such information may be required to be kept by, for example, various gaming regulatory bodies (e.g., the Nevada Gaming Commission) for a period of time; e.g., 75 game plays after the information was accumulated.

The accumulative data to be saved may take the form of text, graphics, frames, video clips, etc. In the simplest case, it is merely textual data describing a game's state, history, statistics, etc. A more memory-intensive form of data storage stores frames (essentially bit maps of video still shots) for selected portions of the game presentation; e.g., frames associated with user inputs and presentation of game outcomes. Some of these frames may have embedded or associated data providing specific details such as state, statistics, etc. as described above. Frame capture for the purpose of preserving accumulative data is described in, for example, U.S. patent application Ser. No. 10/758,828 filed Jan. 15, 2004, herein incorporated by reference in its entirety for all purposes. Yet another way to save relevant game play information is via a game play sequence that re-presents the game as it appeared originally. This involves presentation of a series of frames and associated events, including, for example, user interactive events. It is effectively a movie or video clip of a game play. To implement this type of replay, it will be necessary to preserve essential state information about the game and then re-execute the game code using such state information.

In certain embodiments, the non-modifiable component of a game is saved on a hard drive memory and temporarily loaded into main memory for execution. The accumulative data component (including the permanent data) is sometimes stored on a non-volatile RAM. See U.S. Pat. No. 6,804,763, herein incorporated by reference in its entirety for all purposes. In certain other embodiments, all components of a game may be stored together on NV-RAM, which takes the form of flash memory, MRAM, or other non-volatile storage media which can inexpensively store large quantities of data. Traditionally, NV-RAM has been chosen as a preferred non-volatile storage medium for storing critical data because it is able to handle relatively large data bursts in real time, without introducing delays in the gaming machine system. By the same reasoning, hard drive memory has traditionally not been desirable as a preferred non-volatile storage medium for storing critical data because of its relatively slow access time compared to NV-RAM, for example.

To trigger a change in storage location or state of a particular game component (accumulative and/or un-modifiable), a downloaded game (or games) that was once available on gaming terminal may be made unavailable for future play. As indicated, a game may be deactivated for various reasons such as expiration of a license to the game, poor revenue generation, etc. A game may be deactivated by one or more of the following techniques: (1) deleting at least a portion of the game from all memory on the gaming terminal, (2) moving at least a portion of the game to a different memory device within the terminal or outside the terminal, and (3) rendering the game inactive without moving it from the gaming terminal memory device on which it was once stored. In situation (3), a software mechanism may be control player access to the game, e.g., a flag may be set indicating that the game cannot be presented to a user. Otherwise, the game components may be maintained, as they were, stored on the gaming terminal when the game was available for play.

Depending on the needs of the gaming establishment or the design of a gaming terminal, memory for storing game components after deactivation may be found in any one or more of (1) a local gaming terminal where a downloaded game is played, (2) a peer machine of the terminal, and/or (3) a server networked with the gaming terminal. Any one of these machines may include dedicated NV-RAM, main memory volatile RAM, hard drives, etc. They may also include temporarily attached portable memory such as optical disks, semiconductor memory devices, etc. As indicate, the various game components may be independently and separately stored on any of these devices.

Depending on which forms of accumulative data are employed, a storage procedure for preserving game data after deactivation may dictate different types of and locations of storage media. For example, simple textual data, particularly compacted textual data, may be conveniently stored in NV-RAM, while frames might be more conveniently stored on a mass storage device associated with a server or other network component separate from the gaming terminal where the game play of interest took place.

The accumulative component of a game is optionally compacted or compressed when the game is deactivated or removed from a gaming terminal. Compaction may be performed either on the gaming terminal itself or at some other location, where the accumulative component resides for a period of time. Data compaction and compression techniques are well known to those of skill in the art. Generally, data compaction involves a reduction of the number of data elements, bandwidth, cost, and time for the generation, transmission, and storage of data without loss of information by eliminating unnecessary redundancy, removing irrelevancy, or using special coding. Examples of data compaction methods are the use of fixed-tolerance bands, variable-tolerance bands, slope-keypoints, sample changes, curve patterns, curve fitting, variable-precision coding, frequency analysis, and probability analysis.

In accordance with certain embodiments of the present invention, various components of a game may be stored for various lengths of time after deactivation as specified by, for example, a casino policy. The lengths of storage time specified for particular components may be set according to the needs of a gaming establishment, one of which comprises requirements of regulatory bodies. The lengths of time may be measured in terms of a number of relevant events or in terms continuous time (minutes, days, weeks, months, years, etc.). Examples of event-based storage times include terminal specific actions such number of games played on a terminal, number of different players using player tracking cards on the terminal, number of separate payouts, total value of payouts, number of bonus events realized, etc.

Assume now that after a downloaded game has been deactivated, a user, regulator, and/or gaming establishment needs to review the accumulated data associated with game play of the downloaded game. Such review may involve, in the simplest case, presentation of the relevant data (e.g., critical data or other game history data) in textual form. Alternatively, the review may comprise re-creating the presentation of the game to the player by executing game code (un-modifiable component) using game state data stored after the game was removed. In other situations where particular frames or video clips were maintained as accumulated data after the game was deactivated or removed, the review may simply involve viewing individual frames or video from the stored data.

Any of the above types of review can be performed at any location that has been established (or merely chosen as convenient) by the gaming establishment or regulator. For example, the review may take place at the gaming terminal where the game was played. Alternatively, it may take place at a peer terminal or network server on a gaming network. Some relevant methods and devices involving peer-to-peer file transfers between gaming machines are discussed in U.S. patent application Ser. No. 11/173,442 by Kinsley et al., filed Jul. 1, 2005 and entitled "METHODS AND DEVICES FOR DOWNLOADING GAMES OF CHANCE," which is hereby incorporated by reference in its entirety and for all purposes.

While this invention has been described in terms of several preferred embodiments, there are alterations, permutations, and equivalents, which fall within the scope of this invention.

It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method, comprising:
    (a) installing a game data set at a gaming module of a gaming system;
    (b) providing an exact copy of at least a portion of the game data set at an oversight module of the gaming system;
    (c) randomly and dynamically generating an integrity executable at the oversight module,
    wherein dynamically generating includes choosing a random subset of one or more security algorithms from a security algorithm database for the integrity executable, wherein the integrity executable contains the subset of one or more security algorithms randomly chosen from the security algorithm database;
    (d) sending the integrity executable to the gaming module;
    (e) using the integrity executable, computing a first outcome from the game data set at the gaming module;
    (f) after computing the first outcome, sending the first outcome to the oversight module and removing the integrity executable from the gaming module;
    (g) using the integrity executable, computing a second outcome from the game data set at the oversight module;
    (h) comparing the first and second outcomes to determine whether the first and second outcomes match;
    (i) if the first and second outcomes match, indicating that the game data set is authentic; and
    (j) if the first and second outcomes do not match, indicating that the game data set is not authentic.

2. The method as recited in claim 1 further comprising:
    if the first outcome is not received within a predetermined amount of time starting from when the integrity executable was sent, indicating that the game data set is not authentic.

3. The method as recited in claim 1 wherein the oversight module is stored on a server machine and the gaming module is stored on a client machine.

4. The method as recited in claim 1 wherein the server machine is a central gaming server and the client machine is a remote gaming terminal.

5. The method as recited in claim 1 wherein the server machine is a remote gaming terminal and the client machine is a portable gaming device.

6. The method as recited in claim 1 wherein the integrity executable is based on system configuration of the gaming module and includes one or more security algorithms.

7. The method as recited in claim 1 wherein the integrity executable is sent at randomly varying intervals.

8. A gaming system, comprising:
    an oversight module configured to randomly monitor the integrity of one or more gaming modules operatively coupled to the oversight module to ensure that the gaming modules have not been compromised, the oversight module randomly performing audits of at least the gaming code stored on the gaming modules, the audits indicating whether the gaming code has been changed or altered from a known configuration, wherein the oversight module includes:
        a gaming module configuration database having a copy of the gaming data for each gaming module;
        an algorithm database that includes a plurality of security algorithms;
        an integrity check generator configured for randomly and dynamically generating integrity executables, containing one or more security algorithms, to be run on both the oversight module and a gaming module, wherein dynamically generating includes choosing a random subset of one or more security algorithms from a security algorithm database for the integrity executable, wherein the integrity executable contains the subset of one or more security algorithms randomly chosen from the security algorithm database; and
        a comparator that compares the results of the executable run on the oversight module and the gaming module, a match indicating that the gaming module is trusted, a non match indicating that the gaming module is not trusted.

9. The gaming system as recited in claim 8, wherein the integrity check generator consults the gaming module configuration database to find a gaming module configuration for a particular gaming module to be audited, and uses the gaming module configuration for the particular gaming module to determine what type of data to base the integrity executable on.

10. The gaming system as recited in claim 8, wherein the integrity check generator consults the algorithm database and includes one or more security algorithms in the integrity executable.

11. The gaming system as recited in claim 8, further comprising:
    an interface for sending the integrity executable to the gaming module; and
    a security mechanism for encrypting the integrity executable before sending the integrity executable over the interface.

12. The gaming system as recited in claim 8, wherein the integrity executable includes instructions to erase itself after running on the gaming module.

13. The gaming system as recited in claim 8, further comprising:
    one or more security elements for implementing security measures when the gaming module is not trusted, the security measures being selected from at least terminating gaming operations at the gaming module, performing a self destruct at the gaming module, initiating audio alarms at the oversight module or gaming module, initiating visual alarms at the oversight module or gaming module, or erasing data at the gaming module.

14. The gaming system as recited in claim 8, wherein the gaming system is embodied as a single gaming machine that includes both the oversight module and gaming module.

15. The gaming system as recited in claim 8, wherein the gaming system is embodied as a gaming network with one or more server machines and one or more client machines that communicate over a wired or wireless connection.

16. The gaming system as recited in claim 15, wherein the client machine is a remote gaming terminal.

17. The gaming system as recited in claim 15, wherein the server machine includes the oversight module and the client machine includes the gaming module.

18. The gaming system as recited in claim 15, wherein server machine includes the oversight module and a gaming module and the client machine includes a gaming module.

* * * * *